United States Patent
Noto

(10) Patent No.: US 7,948,552 B2
(45) Date of Patent: May 24, 2011

(54) IMAGE PICKUP APPARATUS

(75) Inventor: Goro Noto, Ohta-ku (JP)

(73) Assignee: Canon Kabushiki Kaisha (JP)

( * ) Notice: Subject to any disclaimer, the term of this patent is extended or adjusted under 35 U.S.C. 154(b) by 953 days.

(21) Appl. No.: 11/753,348

(22) Filed: May 24, 2007

(65) Prior Publication Data
US 2007/0285551 A1 Dec. 13, 2007

(30) Foreign Application Priority Data

May 26, 2006 (JP) ................................. 2006-146608

(51) Int. Cl.
G02B 13/16 (2006.01)
H04N 5/225 (2006.01)
A47L 13/40 (2006.01)
G03B 19/12 (2006.01)

(52) U.S. Cl. ........ 348/340; 348/335; 348/373; 348/374; 15/1.51; 396/357

(58) Field of Classification Search ............. 348/207.99, 348/335, 340, 373, 374; 396/354–359; 15/1.51
See application file for complete search history.

(56) References Cited

U.S. PATENT DOCUMENTS

| | | | | |
|---|---|---|---|---|
| 3,970,905 A * | 7/1976 | Itoh et al. | ................ | 361/233 |
| 6,543,078 B1 * | 4/2003 | Ernst et al. | ................ | 15/1.51 |
| 7,038,865 B2 * | 5/2006 | Ito et al. | ................ | 359/819 |
| 7,057,642 B2 * | 6/2006 | Mogamiya et al. | ...... | 348/207.99 |
| 7,192,202 B2 * | 3/2007 | Matsuki et al. | ................ | 396/358 |
| 7,222,388 B2 * | 5/2007 | Sugihara | ................ | 15/310 |
| 7,355,649 B2 * | 4/2008 | Takai | ................ | 348/372 |
| 7,476,042 B2 * | 1/2009 | Noto et al. | ................ | 396/452 |
| 7,598,978 B2 * | 10/2009 | Hashimoto | ............ | 348/207.99 |
| 7,683,968 B2 * | 3/2010 | Hagihara et al. | ............ | 348/373 |
| 7,705,906 B2 * | 4/2010 | Watanabe | ................ | 348/340 |
| 2001/0053288 A1 * | 12/2001 | Ito et al. | ................ | 396/429 |
| 2001/0055072 A1 * | 12/2001 | Mogamiya et al. | .......... | 348/335 |
| 2005/0052759 A1 * | 3/2005 | Ito et al. | ................ | 359/819 |
| 2005/0104997 A1 * | 5/2005 | Nonaka | ................ | 348/360 |
| 2005/0129394 A1 * | 6/2005 | Ichikawa | ................ | 396/429 |
| 2006/0078330 A1 * | 4/2006 | Noto et al. | ................ | 396/452 |
| 2006/0087584 A1 * | 4/2006 | Noto | ................ | 348/374 |
| 2007/0188649 A1 * | 8/2007 | Hagihara et al. | ............ | 348/335 |
| 2007/0211162 A1 * | 9/2007 | Kaihara et al. | ................ | 348/335 |

FOREIGN PATENT DOCUMENTS

JP 2003-005254 A 1/2003
JP 2004-032191 A 1/2004

* cited by examiner

*Primary Examiner* — David L Ometz
*Assistant Examiner* — Richard Bemben
(74) *Attorney, Agent, or Firm* — Rossi, Kimms & McDowell LLP

(57) ABSTRACT

An image pickup apparatus which can remove a dust stuck to a surface of an optical member such as a cover glass or an optical filter without damaging the surface of the optical member, and which can take a good image without imaging shadows of the dust stuck to the surface of the optical member. An image pickup apparatus comprises an optical element, an image pickup device, and a drive unit. The drive unit applies voltage to a non-uniform electric field generating device and moving the non-uniform electric field generating device to scan an optical incidence plane of the optical element.

17 Claims, 17 Drawing Sheets

IMAGE PICKUP APPARATUS

BACKGROUND OF THE INVENTION

1. Field of the Invention

The present invention relates to an image pickup apparatus.

2. Description of the Related Art

Conventionally, if dust, dirt (hereinafter referred to as "dust") or the like exists in proximity to a focal plane of a shooting lens of a single-lens reflex digital camera, a shadow of the dust may be imaged onto an image captured by a solid image-pickup element and lower image quality. It is considered that such dust is the dust which enters from outside on replacing a lens or fine abrasion powder generated from a member constituting a shutter or a mirror such as a resin or a metal in conjunction with a movement thereof, for instance. If such dust goes into space between a cover glass of the solid image-pickup element and an optical filter placed in front of the cover glass in particular, it is necessary to disassemble the camera in order to remove the dust. For this reason, the camera is provided with a dust-proofing structure to prevent the dust from coming into the space by shutting down the space between the cover glass of the solid image-pickup element and the optical filter from outside.

However, the dust-proofing structure does not prevent the dust from being stuck to an optical incidence plane of the optical filter, and so there are the cases where the dust sticks to the optical incidence plane of the optical filter. Here, in the cases where the optical filter is placed in a position in proximity to the focal plane, the dust stuck to the optical incidence plane is imaged as a shadow onto an image captured by the solid image-pickup element and may cause image quality to degrade.

There is a proposed construction to clean a cover glass surface or an optical filter surface with a wiper (see e.g., Japanese Patent Laid-Open Patent Publication (Kokai) No. 2003-005254). According to this, it is possible to remove the dust stuck to the cover glass surface of the solid image-pickup element or the optical filter surface without taking off the lens and without disassembling the camera.

However, there are the cases where hard dust such as metal powder attaches to the cover glass surface of the solid image-pickup element or the optical filter surface. In such cases, the cover glass surface or the optical filter surface may be scratched by the dust when the wiper slides along the cover glass surface or the optical filter surface.

Thus, to remove the dust stuck to the cover glass surface of the solid image-pickup element or the optical filter surface without scratching the surface, there is a proposed configuration for vibrating the cover glass or the optical filter (see e.g., Japanese Patent Laid-Open Patent Publication (Kokai) No. 2004-032191). To be more specific, according to this configuration, the cover glass or the optical filter is vibrated by a vibrator so as to remove the dust stuck to the cover glass surface or the optical filter surface by vibration thereof.

In the case of the configuration for vibrating the cover glass or the optical filter, however, the configuration needs to prevent the vibration of the cover glass or the optical filter from propagating to any other member. In the case of vibrating the cover glass of the solid image-pickup element, the cover glass and the members fixed on the cover glass may become separate. In the case of vibrating the optical filter, the optical filter and the members fixed on the optical filter may become separate.

SUMMARY OF THE INVENTION

The present invention provides an image pickup apparatus which can remove a dust stuck to a surface of an optical member such as a cover glass or an optical filter without damaging the surface of the optical member, and which can take a good image without imaging shadows of the dust stuck to the surface of the optical member.

In a first aspect of the present invention, there is provided an image pickup apparatus comprising an optical element including an optical incidence plane where light led along an optical path from an object enters, an image pickup device adapted to convert the light having transmitted through the optical element to an electrical signal, a non-uniform electric field generating device adapted to generate a non-uniform electric field for the sake of attracting minute foreign substance stuck to the optical incidence plane to its surface when applying voltage, and a drive unit adapted to apply the voltage to the non-uniform electric field generating device and moving the non-uniform electric field generating device to scan the optical incidence plane of the optical element.

According to the present invention, it is possible to remove a dust stuck to a surface of an optical member without damaging the surface of the optical member, and to take a good image without imaging shadows of the dust stuck to the surface of the optical member.

The above and other objects, features, and advantages of the invention will become more apparent from the following detailed description taken in conjunction with the accompanying drawings.

BRIEF DESCRIPTION OF THE DRAWINGS

FIG. 7A shows a placement of two electrodes, FIG. 7B shows a case where a distance between the two electrodes is fixed, FIG. 7C shows a case where the distance between the two electrodes is not fixed, and FIG. 7D shows coulomb force generated on each of the electrodes of FIG. 7C.

DETAILED DESCRIPTION OF THE PREFERRED EMBODIMENTS

The present invention will now be described in detail with reference to the drawings showing a preferred embodiment thereof. It should be noted that the relative arrangement of the components, the numerical expressions and numerical values set forth in the embodiment do not limit the scope of the present invention unless it is specifically stated otherwise.

Hereinafter, the present invention will now be described in detail with reference to the drawings showing a preferred embodiment thereof.

First Embodiment

Figure 1:
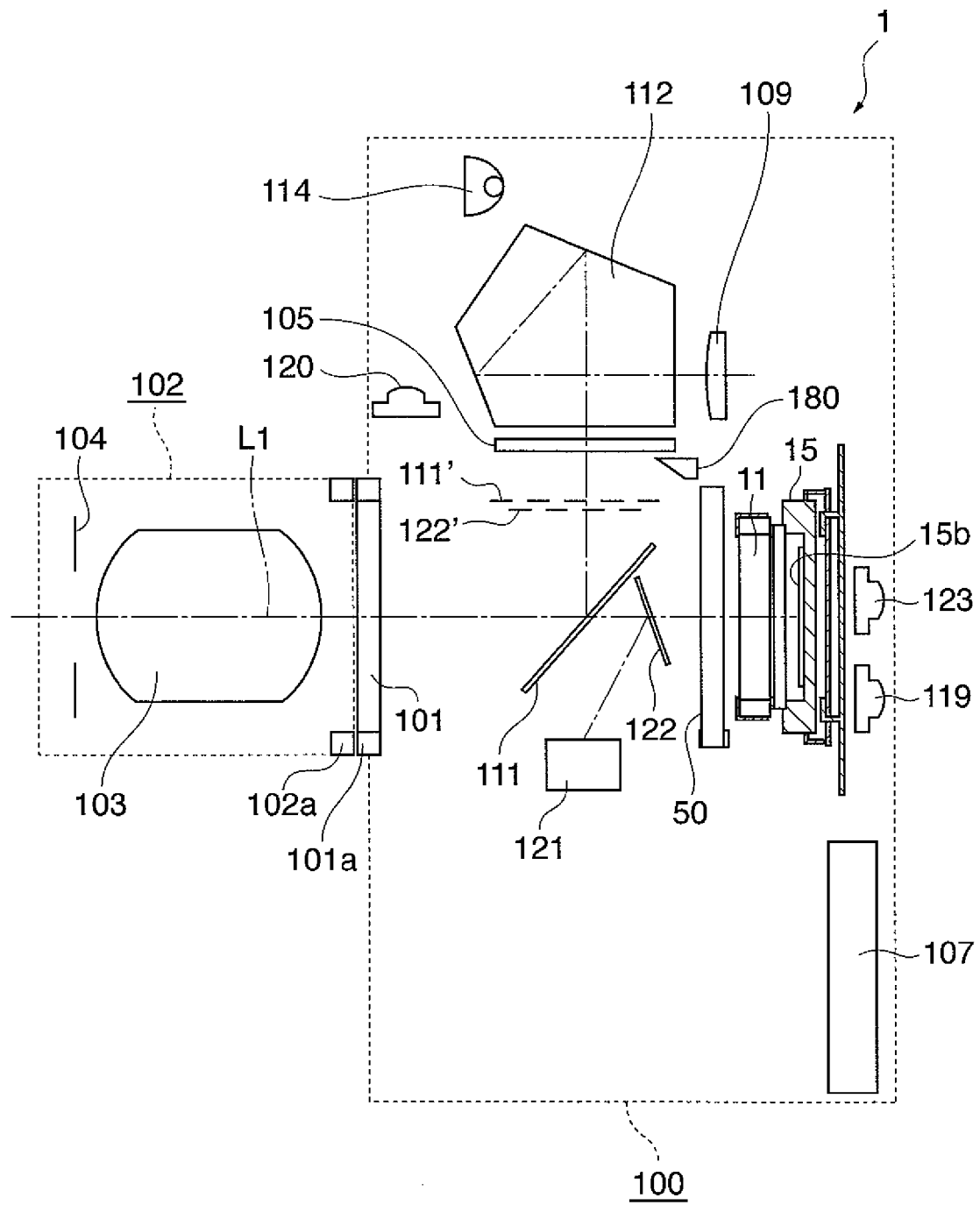
FIG. 1 is a longitudinal cross-sectional view of a digital camera as an image pickup apparatus according to a first embodiment of the present invention.

FIG. 1 is a longitudinal cross-sectional view of a digital camera as an image pickup apparatus according to a first embodiment of the present invention. This embodiment will describe a single-lens reflex digital camera as the image pickup apparatus.

As shown in FIG. 1, a single-lens reflex digital camera 1 includes a camera body 100 having a lens apparatus 102 detachably mounted thereon. The lens apparatus 102 incorporates a photographic optical system 103 for defining an optical path L1 of image-taking light, a diaphragm 104 for regulating the amount of incident light entering the photographic optical system 103 along the optical path L1, a terminal 102a and the like. The terminal 102a is the terminal to be electrically connected to a terminal 101a when the lens apparatus 102 is mounted on a mount mechanism 101 described later.

The camera body 100 includes the mount mechanism 101 for detachably mounting the lens apparatus 102 and a half mirror 111 which is movable within a predetermined range. The refractive index of the half mirror 111 is approximately 1.5, and the thickness thereof is 0.5 mm. The half mirror 111 moves between a first optical path split position and a second optical path split position. Here, the first optical path split position is a position for the half mirror 111 to reflect a part of the plight having entered from the photographic optical system 103 along the optical path L1 toward a focusing screen 105 and transmit the rest. The second optical path split position is a position for the half mirror 111 to retract from the optical path L1 (a position 111' shown by a broken line in FIG. 1).

An image of light reflected by the half mirror 111 is formed on the focusing screen 105, and this optical image is guided to the outside from a finder lens 109 after passing through the interior of a pentaprism 112. This allows a photographer to observe the optical image formed on the focusing screen 105 through the finder lens 109. Specific information (such as a shutter speed, a diaphragm value and a shooting mode) is displayed on the focusing screen 105 by an information display section 180.

A movable sub mirror 122 is provided on the back side of this half mirror 111. The sub mirror 122 reflects the light close to the optical path L1 out of the light passed through the half mirror 111. The reflected light is guided to a focus detection unit 121. The focus detection unit 121 receives the reflected light from the sub mirror 122, and performs focus detection based on the received light by a phase difference detection scheme.

The sub mirror 122 moves in conjunction with movement of the half mirror 111 while angularly rotating around a rotation shaft (not shown) provided on a holding member (not shown) of the half mirror 111. When the half mirror 111 is in the first optical path split position, the sub mirror 122 is in a position to reflect the light passed through the half mirror 111 to the focus detection unit 121. In comparison, when the half mirror 111 moves to the second optical path split position, the sub mirror 122 moves to a position retracted from the optical path L1 (a position 122' indicated in broken line in FIG. 1) in conjunction therewith.

On a back side of the half mirror 111, there are a focal plane shutter 50 for controlling the amount of light incident upon a solid image-pickup element 15b of a solid image-pickup apparatus 15, an optical filter 11, the solid image-pickup apparatus 15 and the like arranged in order. Details thereof will be described later.

The camera body 100 is provided with a movable flash light emitting unit 114, a display 107, a main switch 119, a shutter release button 120 and a cleaning switch 123.

The flash light emitting unit 114 is movable between a housing position to be housed in the camera body 100 and a light emitting position to be exposed outside from the camera body 100. FIG. 1 is the state in which the flash light emitting unit 114 is in the light emitting position. The display 107 is made up of a liquid crystal display or the like, and displays a captured image or various kinds of information including a shooting conditions and the like.

The main switch 119 is a switch for starting the camera body 100. The shutter release button 120 is a button capable of operating by being pressed in two stages. When the shutter release button 120 is pressed halfway down (SW1 on), photographing preparation operation (a photometric operation, a focus control operation and the like) is started. When the shutter release button 120 is pressed to the full (SW2 on), a photographic operation (recording image data read from the solid image-pickup apparatus 15 into the memory) is started. The cleaning switch 123 is a switch for setting a cleaning mode. The cleaning mode is a mode for removing the dust stuck to an optical incidence plane, that is, a surface (an opposed face to the focal plane shutter 50) of the optical filter 11.

Figure 2:
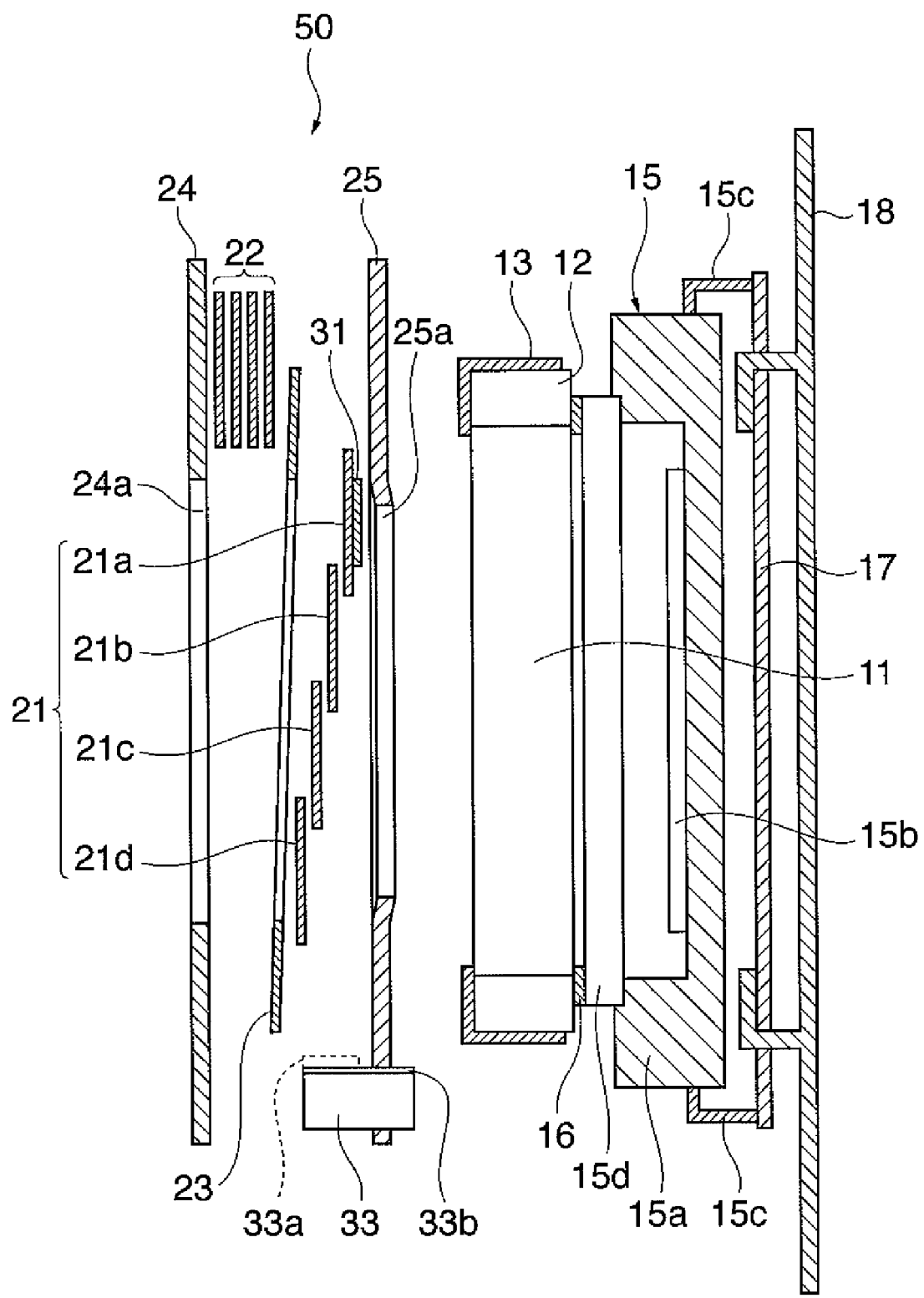
FIG. 2 is a longitudinal cross-sectional view showing the configuration of peripheral components of a focal plane shutter and a solid image-pickup apparatus of FIG. 1.

Next, the configuration of the focal plane shutter 50 and the periphery of the solid image-pickup apparatus 15 will be explained with reference to FIG. 2. FIG. 2 is a longitudinal cross-sectional view showing the configuration of peripheral components of the focal plane shutter 50 and the solid image-pickup apparatus 15 of FIG. 1.

As shown in FIG. 2, the focal plane shutter 50 has a front screen 21, a rear screen 22, a holding plate 24, a cover plate 25 and an intermediate plate 23. The front screen 21 is composed of a plurality of shutter blades 21a to 21d. Here, an electrode member 31 which will be described later is attached to the face of the shutter blade 21a opposed to the optical filter 11. The rear screen 22 is composed of a plurality of shutter blades as with the front screen 21. The holding plate 24 is a holding plate of the rear screen 22, and is provided with an opening 24a for receiving image-pickup light in the center thereof. The cover plate 25 is a holding plate of the front screen 21, and is provided with an opening 25a for receiving image-pickup light in the center thereof. The intermediate plate 23 is inserted between the holding plate 24 and the cover plate 25. The space between the holding plate 24 and the cover plate 25 is separated into a space for driving the front screen 21 and a space for driving the rear screen 22 by the intermediate plate 23 respectively. The cover plate 25 is provided with a member 33. The member 33 has a stopper section 33a for positioning the shutter blades 21a to 21d of the front screen 21 when they open and an absorbing section 33b having viscosity capable of absorbing the dust separating from the surface of the optical filter 11. Details of the focal plane shutter 50 will be described later.

As shown in FIG. 2, in order to prevent an excessively high spatial frequency component from entering the solid image-pickup apparatus 15, the optical filter 11 arranged between the focal plane shutter 50 and the solid image-pickup apparatus 15 has a filter characteristic for limiting the passage of this frequency component. The optical filter 11 is made up of a birefringent plate such as crystal and an infrared cut filter laminated together.

The edge of the optical filter 11 is held by holding member 12, and the holding member 12 is united with the optical filter 11 and supported by a supporting member 13. The supporting member 13 is fixed to a chassis (not shown) of the camera body 100.

The solid image-pickup apparatus 15 has a base 15a opening toward the optical filter 11 side. The base 15a incorporates a solid image-pickup element 15b. The solid image-pickup element 15b is made up of, for example, a CMOS process compatible sensor which is one of amplification-type solid image-pickup elements. The solid image-pickup element 15b is connected with a plurality of connection terminals 15c, and is electrically connected with a substrate 17 via each of the connection terminals 15c. The opening of the base 15a is covered with a transparent cover member 15d for protecting the solid image-pickup element 15b, and the space in the base 15a is sealed from the outside by this cover member 15d. The cover member 15d is placed with a predetermined interval to the optical filter 11, where the space generated between the cover member 15d and the optical filter 11 is sealed from the outside by a seal member 16. This prevents the dust from entering into the space between the cover member 15d and the optical filter 11. The substrate 17 and the solid image-pickup apparatus 15 are united together and held by a holding plate 18 which is fixed on a chassis (not shown) of the camera body 100 using screws (not shown).

Figure 3:
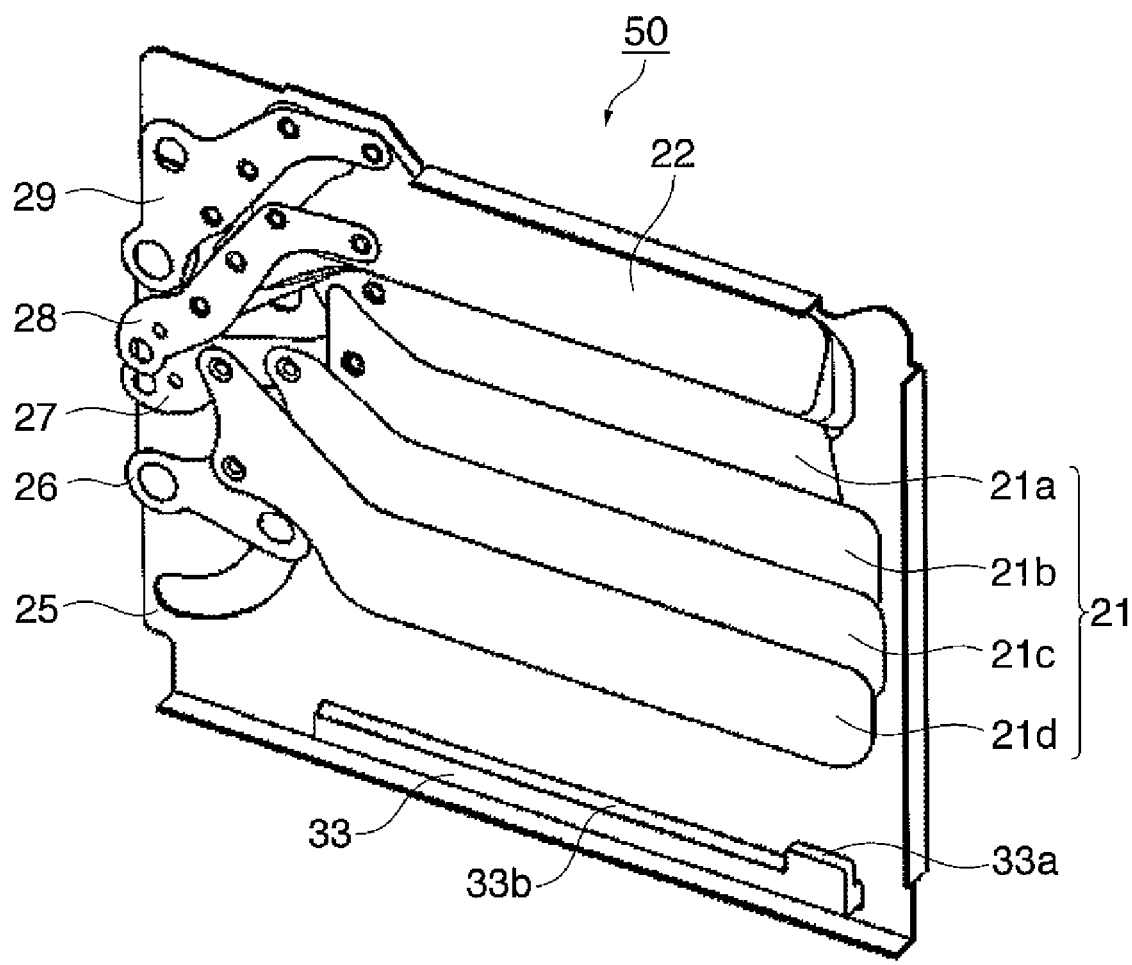
FIG. 3 is a perspective view of a front screen and a rear screen in FIG. 2 viewed from an object side.
Figure 4:
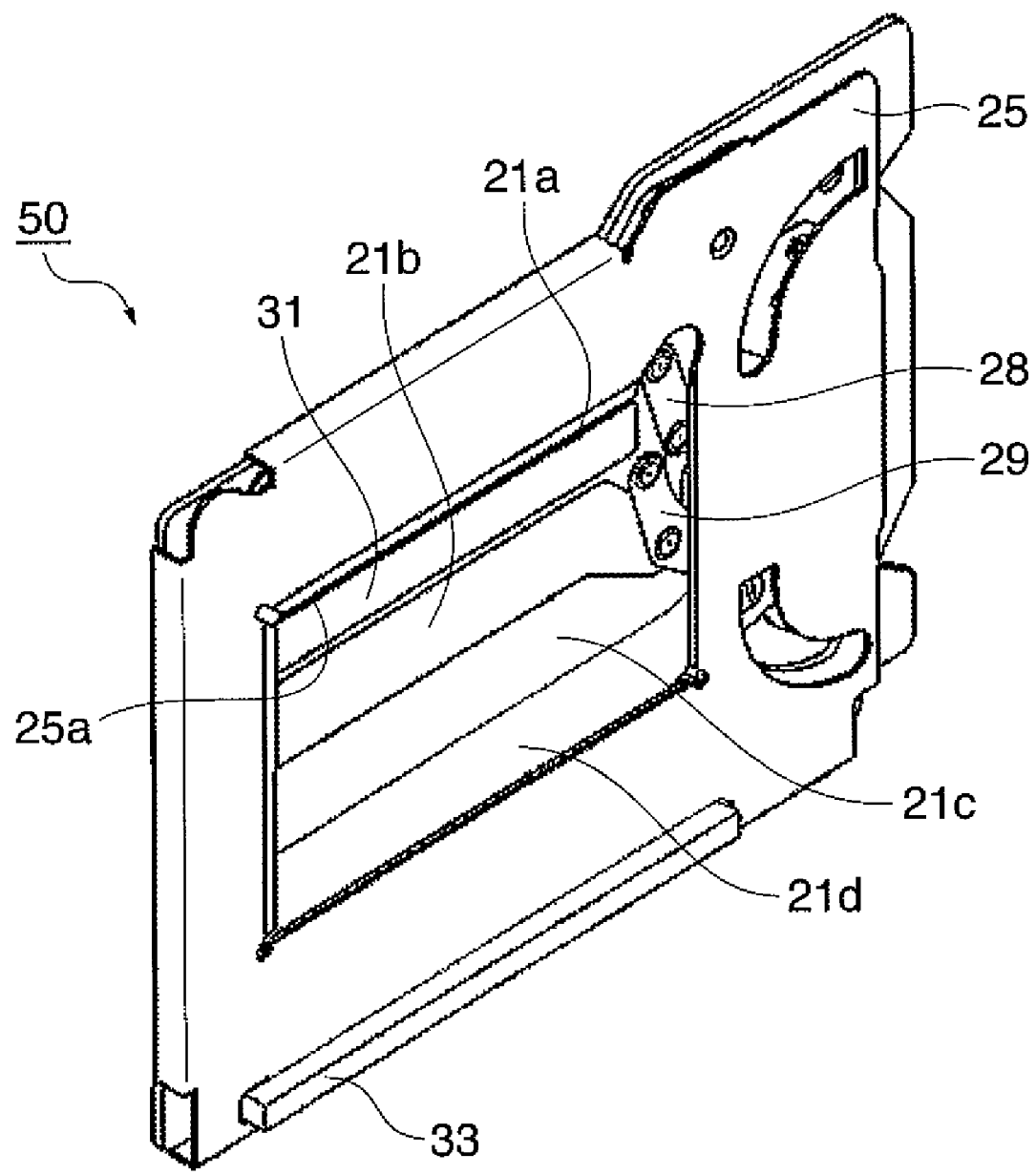
FIG. 4 is a perspective view showing a state in which the front screen is closing an opening of a cover plate in FIG. 2.
Figure 5:
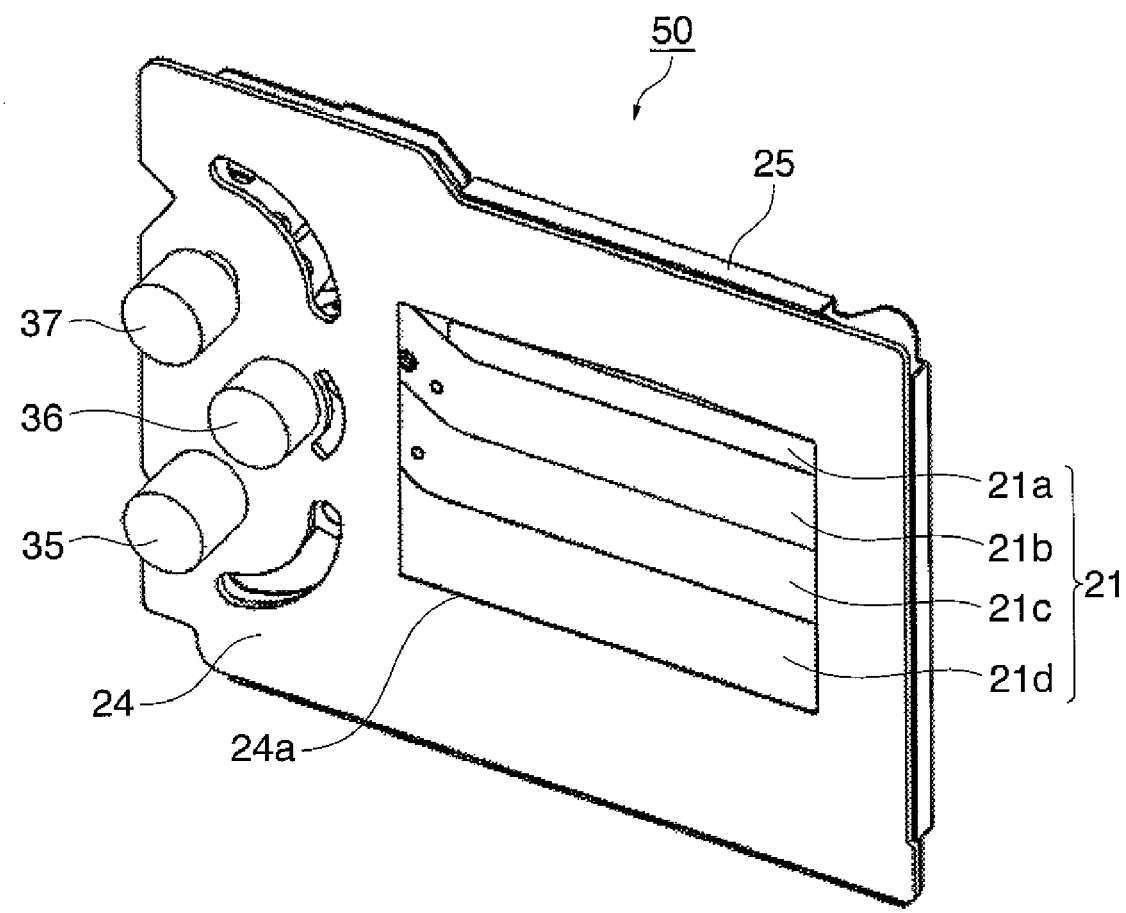
FIG. 5 is a perspective view showing a state in which the front screen is closing the opening of a holding plate in FIG. 2.
Figure 6:
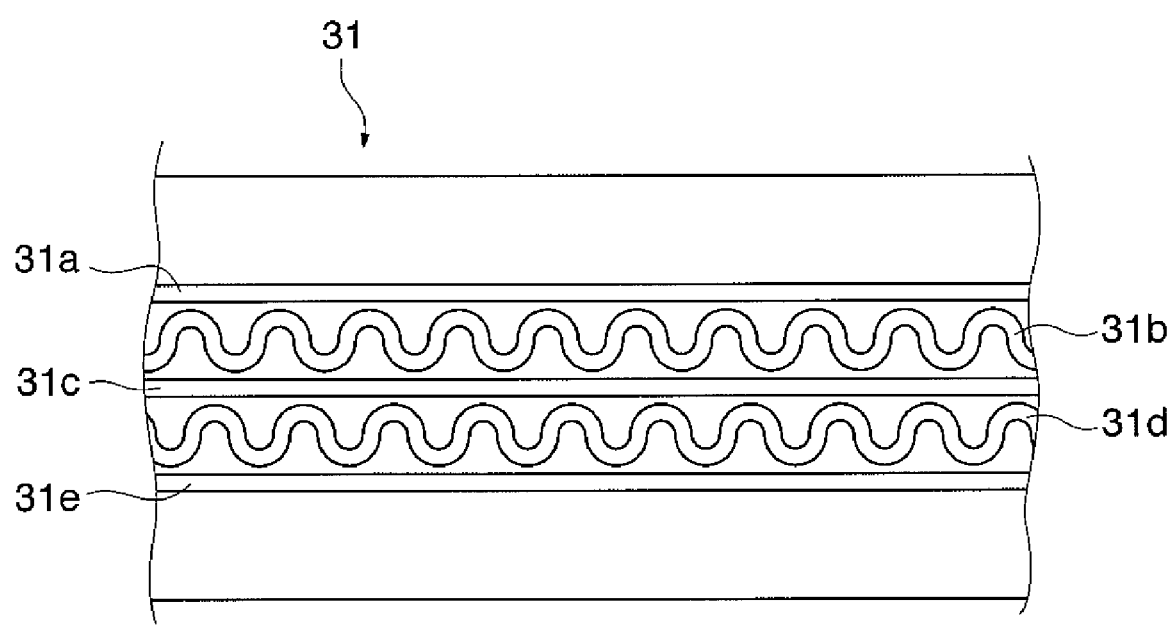
FIG. 6 is an elevation view showing placement of each of electrodes provided to an electrode member in FIG. 2.

Next, the configuration of the focal plane shutter 50 will be described in detail with reference to FIGS. 3 to 6. FIG. 3 is a perspective view of the front screen 21 and rear screen 22 in FIG. 2 viewed from an object side. FIG. 4 is a perspective view showing a state in which the front screen is closing the opening 25a of the cover plate 25 in FIG. 2. FIG. 5 is a perspective view showing a state in which the front screen 21 is closing the opening 24a of the holding plate 24 in FIG. 2. FIG. 6 is an elevation view showing placement of each of electrodes 31a to 31e provided to the electrode member 31 in FIG. 2.

As shown in FIG. 3, the front screen 21 (shutter blades 21a to 21d) of the focal plane shutter 50 operates to control receiving of the image-pickup light to the opening 24a of the holding plate 24 and the opening 25a of the cover plate 25 through driving of a driving lever 26 and driving of a charge lever 27. As shown in FIG. 5, the driving lever 26 is driven by a front screen driving source 35, and the charge lever 27 is driven by a charge driving source 36. The front screen driving source 35 is an electromagnetic actuator composed of a coil, a yoke and the like. The charge driving source 36 is composed of a spring and the like. As the configurations of the front screen driving source 35 and the charge driving source 36 are heretofore known, a detailed description thereof will be omitted here.

As shown in FIGS. 3 and 4, the rear screen 22 (shutter blades) operates to control receiving of the image-pickup light to the opening 24a of the holding plate 24 and the opening 25a of the cover plate 25 through driving of rear screen driving levers 28 and 29. As shown in FIG. 5, the rear screen driving levers 28 and 29 are driven by a rear screen driving source 37 respectively. The rear screen driving source 37 is an electromagnetic actuator composed of a coil, a yoke and the like. As the configuration of the rear screen driving source 37 is heretofore known, a detailed description thereof will be omitted here.

Of the shutter blades 21a to 21d of the front screen 21, the electrode member (non-uniform electric field generating elements) 31 is attached to the face of the shutter blade 21a opposed to the optical filter 11 as shown in FIG. 4. A plurality of electrodes 31a to 31e are provided on the face of the electrode member 31 opposed to the optical filter 11 as shown in FIG. 6. The electrodes 31a, 31c and 31e are composed of belt-like electrodes linearly extending in a direction orthogonal to the optical path L1, and are joined by the same member (not shown) so as to be at the same potential. In comparison, the electrodes 31b and 31d are placed between the electrodes 31a and 31c and between the electrodes 31c and 31e respectively, and are composed of belt-like electrodes extending along curves like sine waves. The electrodes 31b and 31d are joined by another same member (not shown) so as to be at the same potential. Voltage is applied to generate preset potential differences between the potential Voltage of the electrodes 31a, 31c and 31e and the potential Voltage of the electrodes 31b and 31d. Thus, gradient force is generated between the electrodes 31a and 31b, between the electrodes 31b and 31c, among the electrodes 31c and 31d, and between the electrodes 31d and 31e respectively.

Next, the gradient force and effects thereof will be described with reference to FIGS. 7A to 7D. FIGS. 7A to 7D are diagrams schematically showing a principle of generating the gradient force among the electrodes provided to the electrode member 31.

Figure 7A:
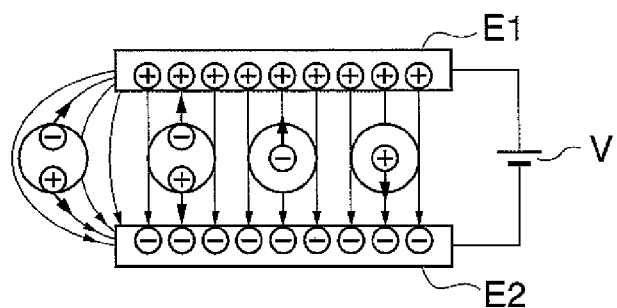
FIGS. 7A to 7D are diagrams schematically showing a principle of generating gradient force between the electrodes provided to the electrode member, where

Here, as shown in FIG. 7A, two electrodes E1 and E2 are provided to be opposed on a common plane. Voltage V is applied between the electrodes E1 and E2 to generate a preset voltage phase difference. Thus, a uniform electric field section is generated in the space between the electrodes E1 and E2. Consideration is given to the cases where a positively-charged particle, a negatively-charged particle and an uncharged particle are inserted between the electrodes E1 and E2.

If each of the positively-charged particle, negatively-charged particle and uncharged particle enters the space between the electrodes E1 and E2, the positively-charged particle is moved to a negative electrode side by coulomb force while the negatively-charged particle is moved to a positive electrode side by coulomb force. In comparison, the uncharged particle is moved to neither side. This is because, while the uncharged particle has an internal charge generated by polarization, the generated coulomb force matches with it.

When the uncharged particle is positioned not between the electrodes E1 and E2 but in a non-uniform electric field section at an end thereof, component force is generated to the coulomb force of the uncharged particle according to a bend of an electric line of force. The component force is the gradient force. Even when the positively-charged particle and the negatively-charged particle are positioned in the non-uniform electric field section, the gradient force is generated likewise by polarization. Therefore, acting force to these particles in the case where they are positioned in the non-uniform electric field section is resultant force of the coulomb force and the gradient force.

Figure 7B:
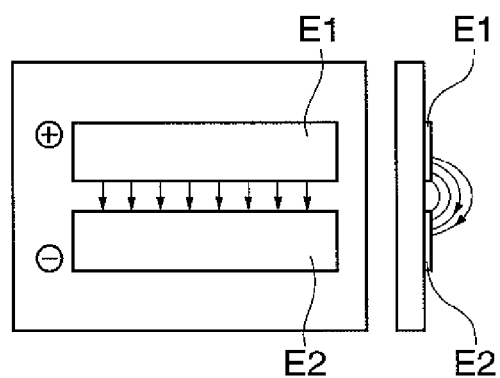

Next, a description will be given as to the gradient force in each of the cases where a distance (gap length) between the two electrodes formed to be mutually opposed on the common plane is fixed and not fixed. For instance, a first case is the case where the distance (gap length) between the two electrodes E1 and E2 is fixed as shown in FIG. 7B. In the first case, the electrodes E1 and E2 are in a rectangular planar shape respectively, and are placed so that the distance between mutual opposed marginal parts is fixed.

Figure 7C:
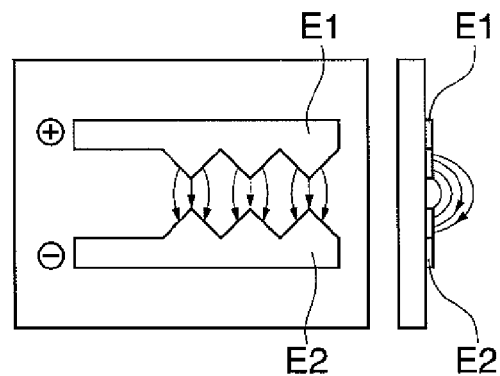

A second case is the case where the distance (gap length) between the two electrodes E1 and E2 is not fixed as shown in FIG. 7C. In the second case, the electrodes E1 and E2 are in a rectangular planar shape where one of the marginal parts along a longitudinal direction is formed in a waveform, and are placed so that their respective marginal parts in the waveform are mutually opposed. Thus, the distance between the two electrodes E1 and E2 is not fixed.

Figure 7D:
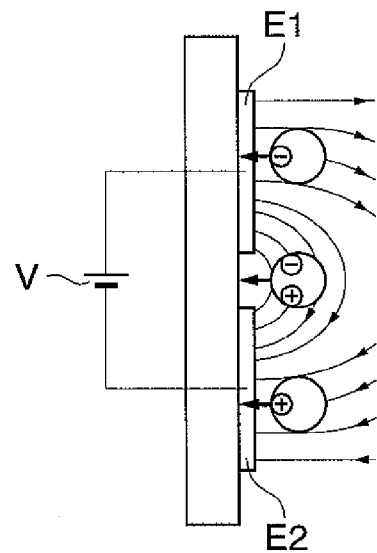

Compared the first case with the second case, the non-uniform electric field section is also generated in a planar direction of the electrodes in the second case. To be more specific, non-uniformity of the electric field becomes more significant in the second case than in the first case, and so the gradient force acts in the planar direction and thickness direction of the electrodes respectively. That is, when the voltage V is applied between the electrodes E1 and E2 in the second case as shown in FIG. 7D, the positively-charged particle is attracted to the electrode on the negative electrode side by the coulomb force while the negatively-charged particle is attracted to the electrode on the positive electrode side by the coulomb force respectively. And the uncharged particle is attracted to an area between the electrodes by the gradient force. Therefore, in the case of the configuration of the second case, it is possible to obtain attraction effects of both the gradient force and electrostatic force.

Therefore, this embodiment adopts the above-mentioned configuration of the electrodes 31a to 31e of the electrode member 31 as a configuration for not fixing the distance (gap length) between the electrodes. Thus, vertical force which is the coulomb force and shearing force of the gradient force act on the dust stuck to the surface of the optical filter 11 opposed to the electrode member 31. Consequently, whether or not charged, the dust stuck to the surface of the optical filter 11 separates from the surface of the optical filter 11 to be attracted on the surface of the electrode member 31.

Figure 8:
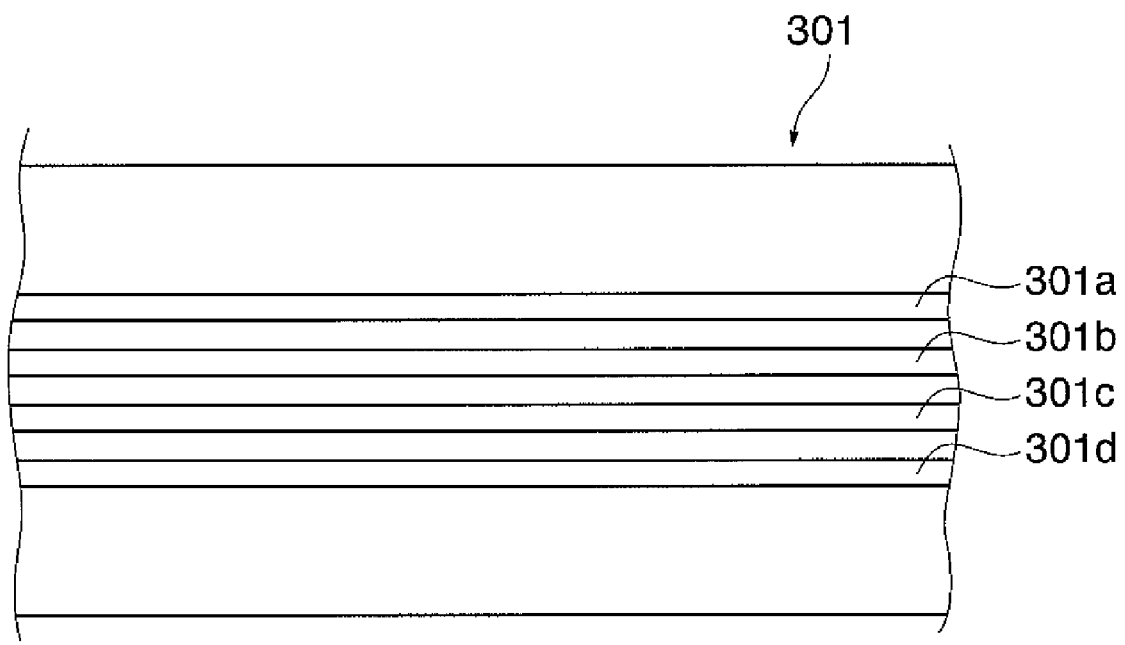
FIG. 8 is a front view showing the configuration of an electrode member prepared for comparison to the electrode member in FIG. 6.

Next, dust removing advantages of the electrode member 31 will be described with reference to FIG. 8. FIG. 8 is a front view showing the configuration of an electrode member prepared for comparison to the electrode member 31 in FIG. 6.

Here, a comparison is made as to the respective dust removing advantages in the case of using the above-mentioned electrode member 31 in FIG. 6 and in the case of using an electrode member 301 shown in FIG. 8. As shown in FIG. 8, the electrode member 301 has a plurality of electrodes 301a to 301d formed thereon. The electrodes 301a to 301d are composed of elongated electrodes linearly extending like belts and placed so that their respective intervals are fixed. The electrodes 301a and 301c are joined to be at the same potential, and the electrodes 301b and 301d are joined to be at the same potential. To be more specific, the electrode member 301 is configured to have a fixed electrode interval as with the example shown in FIG. 7B.

A method for checking the dust removing advantages of the electrode members 31 and 301 is as follows.

Polystyrene particles of which average grain size is 50 μm are used as the dust stuck to the surface of the optical filter 11. First, the polystyrene particles are dispersed on the surface of a member configured equivalently to the optical filter 11, and a number Pa of the polystyrene particles on the surface of the member is counted. Here, 300 polystyrene particles are dispersed. And preset voltage V is applied to the electrode members 31 and 301 so that the surface of the member is scanned by the electrode members 31 and 301. After this scan, a number Pb of the polystyrene particles remaining on the surface of the member is counted.

Next, a dust removal ratio Q defined by the following formula (1) is acquired.

$$Q = \{(Pa - Pb)/Pa\} \times 100 (\%)$$

Here, a difference between the number Pa and the number Pb of the polystyrene particles (Pa−Pb) represents the number of the polystyrene particles attracted by the electrode members 31 and 301.

To acquire the removal ratios of the electrode members 31 and 301 by the above-mentioned method respectively, the removal ratio Q of the electrode member 31 is approximately 71%, and the removal ratio Q of the electrode member 301 is approximately 61%. It is thereby understandable that the removal ratio Q of the electrode member 31 (electrode interval is not fixed) is higher than the removal ratio Q of the electrode member 301 (electrode interval is fixed) by 10% or so.

Figure 9:
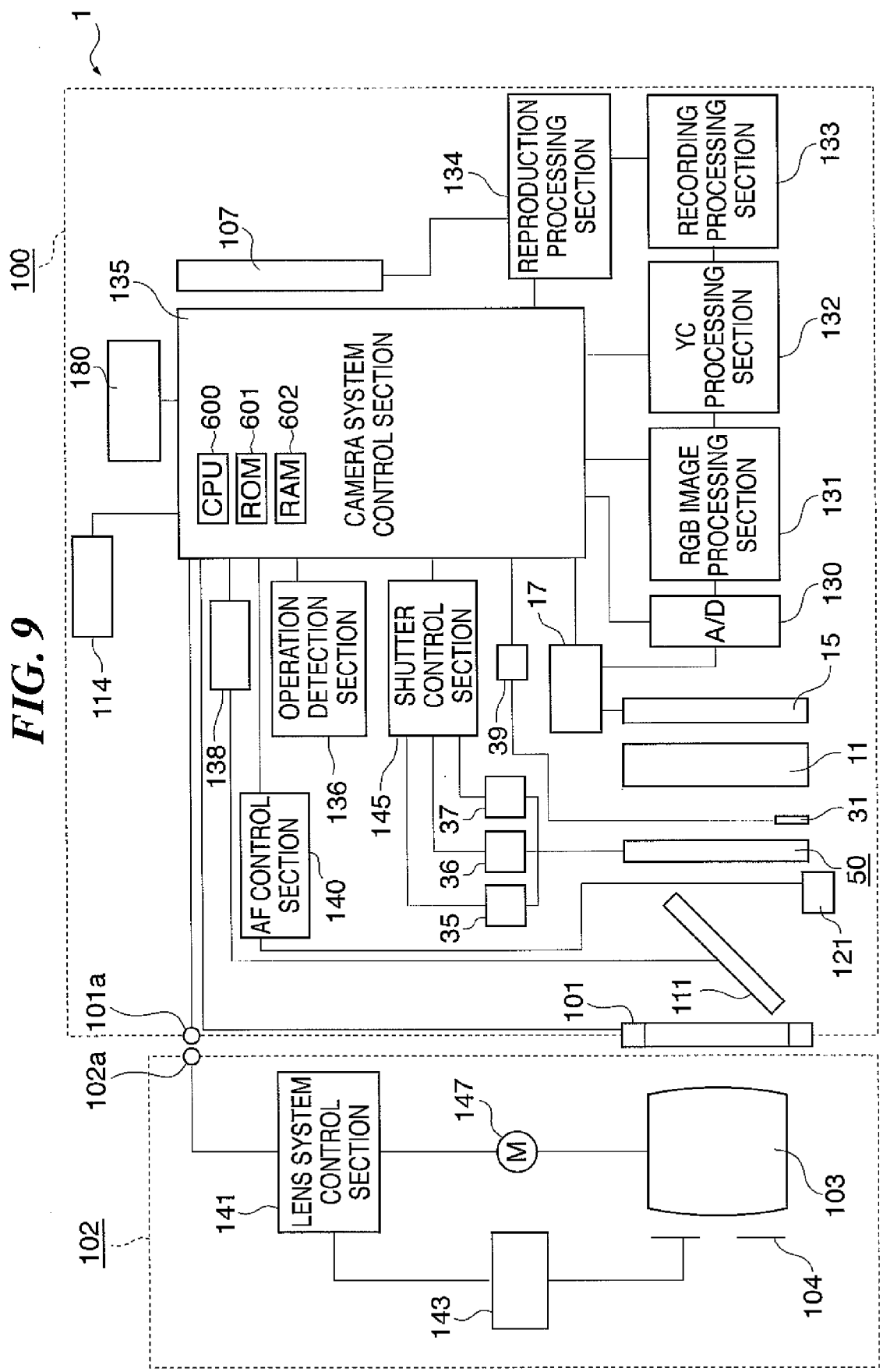
FIG. 9 is a block diagram showing a control configuration of the digital camera.

Next, a control configuration of the digital camera 1 of this embodiment will be described with reference to FIG. 9. FIG. 9 is a block diagram showing the control configuration of the digital camera 1.

As shown in FIG. 9, in the control configuration of this embodiment, the camera body 100 of the digital camera 1 is provided with a camera system control section 135. The camera system control section 135 has a CPU 600, a ROM 601, a RAM 602 and the like so as to control the whole digital camera 1 and perform various types of individual control.

When the lens apparatus 102 is coupled with the camera body 100 through the mount mechanism 101, the terminal 101a and terminal 102a are electrically connected to allow the camera system control section 135 to communicate with a lens system control section 141. The lens system control section 141 sends out a lens state signal indicating a state (diaphragm value of the diaphragm 104, focal length, position of the focus lens and the like) of the lens apparatus 102 to the camera system control section 135.

The camera system control section 135 receives the lens state signal, a detection signal from an operation detection section 136, a signal from an AF control section 140 and the like inputted thereto. Here, the operation detection section 136 detects whether or not there are any operation performed as to the main switch 119, the shutter release button 120, cleaning switch 123 of FIG. 1 and the like, and outputs an operation detection signal for indicating a detection result thereof to the camera system control section 135. The AF control section 140 generates a signal for indicating a focus control state (defocus amount) of the photographic optical system 103 based on an output signal from the focus detection unit 121 and outputs the signal to the camera system control section 135. The focus detection unit 121 detects an in-focus state of an image in a focus detection area provided at a predetermined position in its image-taking screen based on the reflected light from the sub mirror 122 in FIG. 1 so as to output a signal for indicating this detection result.

The camera system control section 135 generates control signals for the lens system control section 141 based on the lens state signal, the detection signal from the operation detection section 136, the signal from the AF control section 140 and the like. The camera system control section 135 individually generates the control signal to each of the sections of the camera body 100 based on each of the signals. To be more precise, the control signal for each of a half mirror drive section 138, a shutter control section 145, a power supply 39 and the substrate 17 is individually generated. And the control signal for each of an A/D converter 130, an RGB image processing section 131, a YC processing section 132, a recording processing section 133, a reproduction processing section 134, an information display section 180 and the flash light emitting unit 114 is individually generated. The control signals are the signals to control operation timing, operation contents and the like.

The lens system control section 141 generates a drive signal of a diaphragm drive section 143 for driving the diaphragm 104 based on the control signal from the camera system control section 135. The diaphragm drive section 143 drives the diaphragm 104 according to the drive signal so that the diaphragm diameter of the diaphragm 104 becomes the diaphragm value specified by the control signal. The lens system control section 141 generates a drive signal of an AF motor 147 for driving the focus lens of the photographic optical system 103 based on the control signal from the camera system control section 135. The AF motor 147 moves the focus lens to a position specified by the control signal according to the drive signal.

The half mirror drive section 138 of the camera body 100 drives the half mirror 111 based on the control signal from the camera system control section 135. The shutter control section 145 outputs a drive signal to each of the front screen driving source 35, charge driving source 36 and rear screen driving source 37 of the focal plane shutter 50 based on the control signal from the camera system control section 135. Thus, the front screen 21 and rear screen 22 are driven to be able to obtain a setup shutter speed. The power supply 39 applies preset voltage to the electrode member 31 (electrodes 31a to 31e in FIG. 6) provided to the shutter blade 21a of the front screen 21 (FIG. 2) based on the control signal from the camera system control section 135. The substrate 17 reads the image-pickup signal (electric signal) of the solid image-pickup apparatus 15 at corresponding timing based on the control signal from the camera system control section 135 so as to output the read image-pickup signal to the A/D converter 130.

The A/D converter 130 converts the image-pickup signal to each of 10-bit digital signals of R, G and B according to amplitude of the image-pickup signal. The RGB image processing section 131 applies white balancing, gamma correction, high-resolution processing through an interpolation and the like to each of the digital signals of R, G and B inputted from the A/D converter 130. The YC processing section 132 generates a brightness signal Y and color-difference signals R-Y and B-Y from the each digital signal of R, G and B inputted from the RGB image processing section 131. The generated brightness signal Y and color-difference signals R-Y and B-Y are inputted as image signals to the recording processing section 133. The operation of each of the A/D converter 130, RGB image processing section 131 and YC processing section 132 is controlled by the control signal outputted to each of them from the camera system control section 135 to the respective sections.

The recording processing section 133 performs writing processing writing the inputted image signals to a memory (not shown) such as a CF card (registered trademark) and also performs reading processing reading the image signals from the memory based on the control signal from the camera system control section 135. The reproduction processing section 134 reproduces the image signals read from the memory based on the control signal from the camera system control section 135 so as to output the reproduced image signal to the display 107. It is also possible to adopt a configuration for connecting the reproduction processing section 134 and the display 107 via radio communication such as Bluetooth (registered trademark). In this case, it is possible to monitor an image taken by the digital camera 1 at a position remote from the digital camera 1.

The information display section 180 displays specific information on the focusing screen 105 (FIG. 1) based on the control signal from the camera system control section 135. The specific information to be displayed is information given together with the control signal from the camera system control section 135. The flash light emitting unit 114 emits flash light at corresponding timing based on the control signal from the camera system control section 135.

Figure 10A:
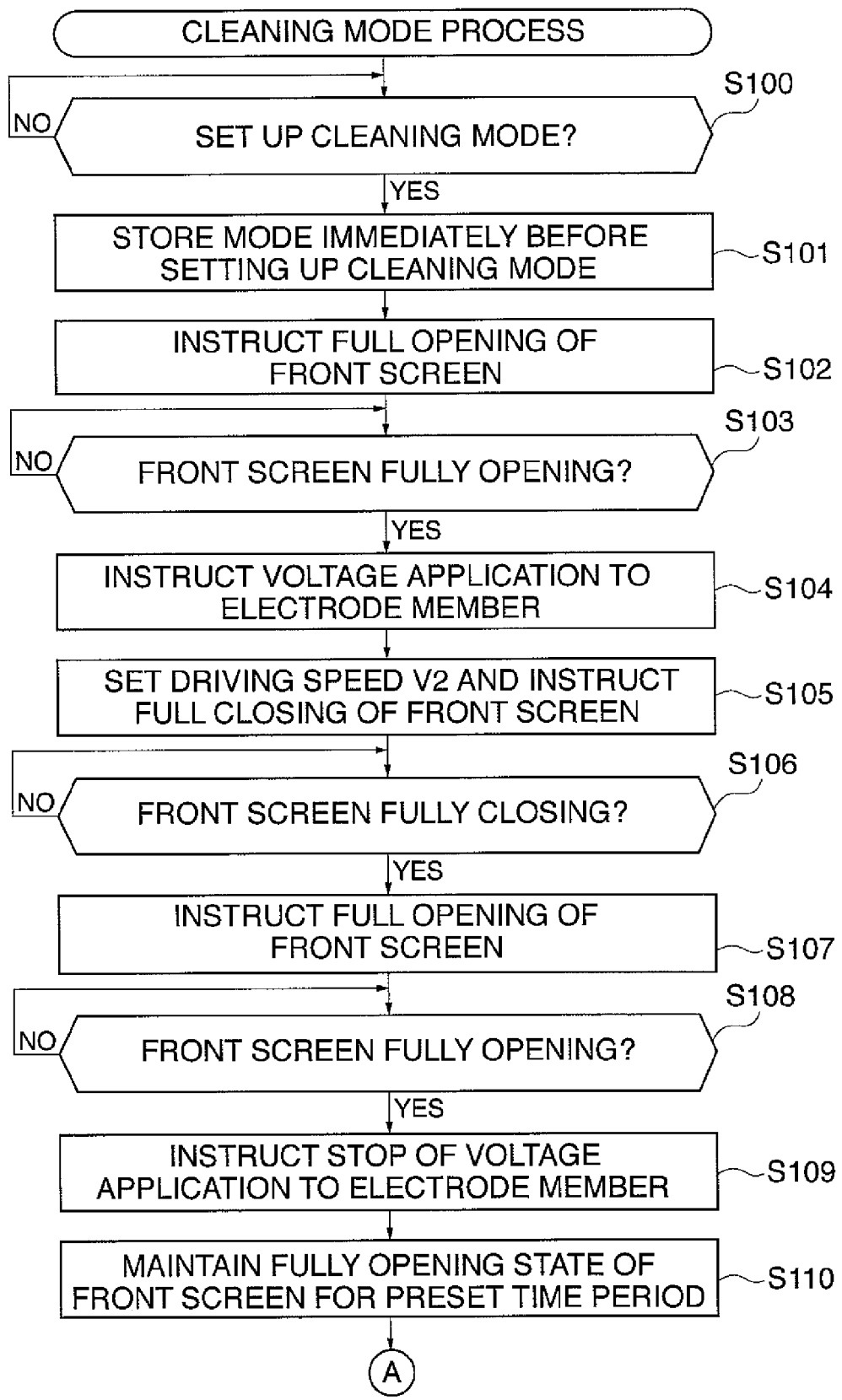
FIGS. 10A and 10B are flow charts showing a procedure of a cleaning mode process executed by a camera system control section.
Figure 10B:
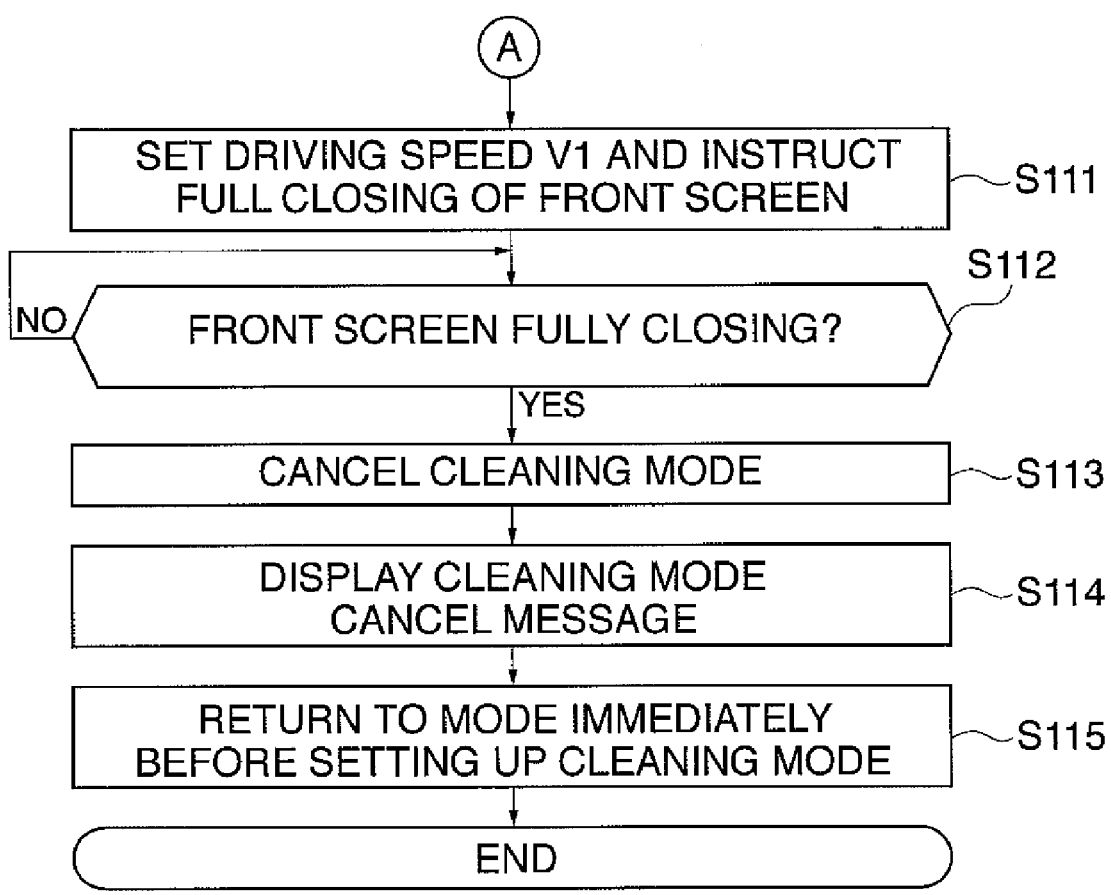
Figure 11:
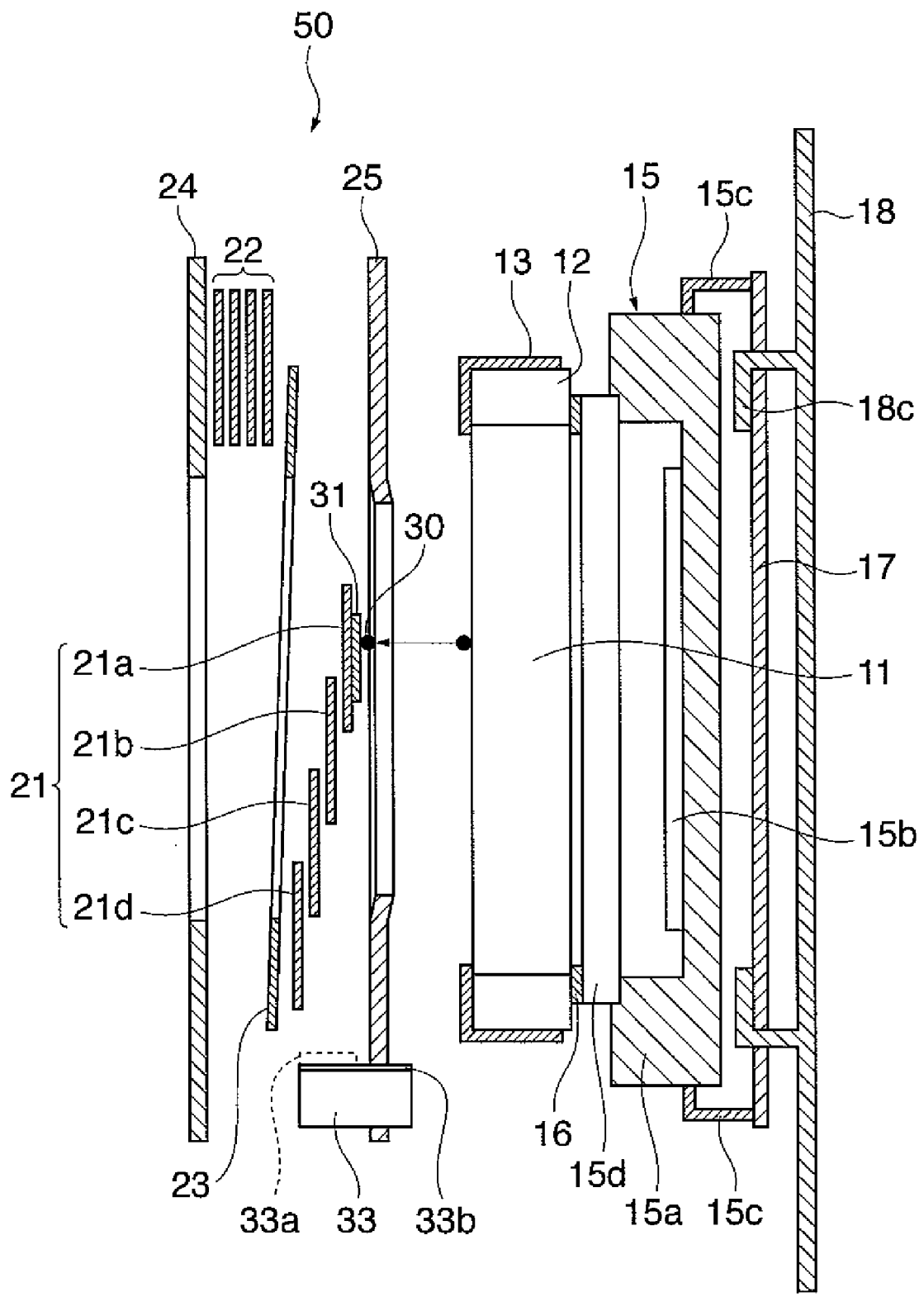
FIG. 11 is a longitudinal cross-sectional view of a state during opening operation of the front screen.
Figure 12:
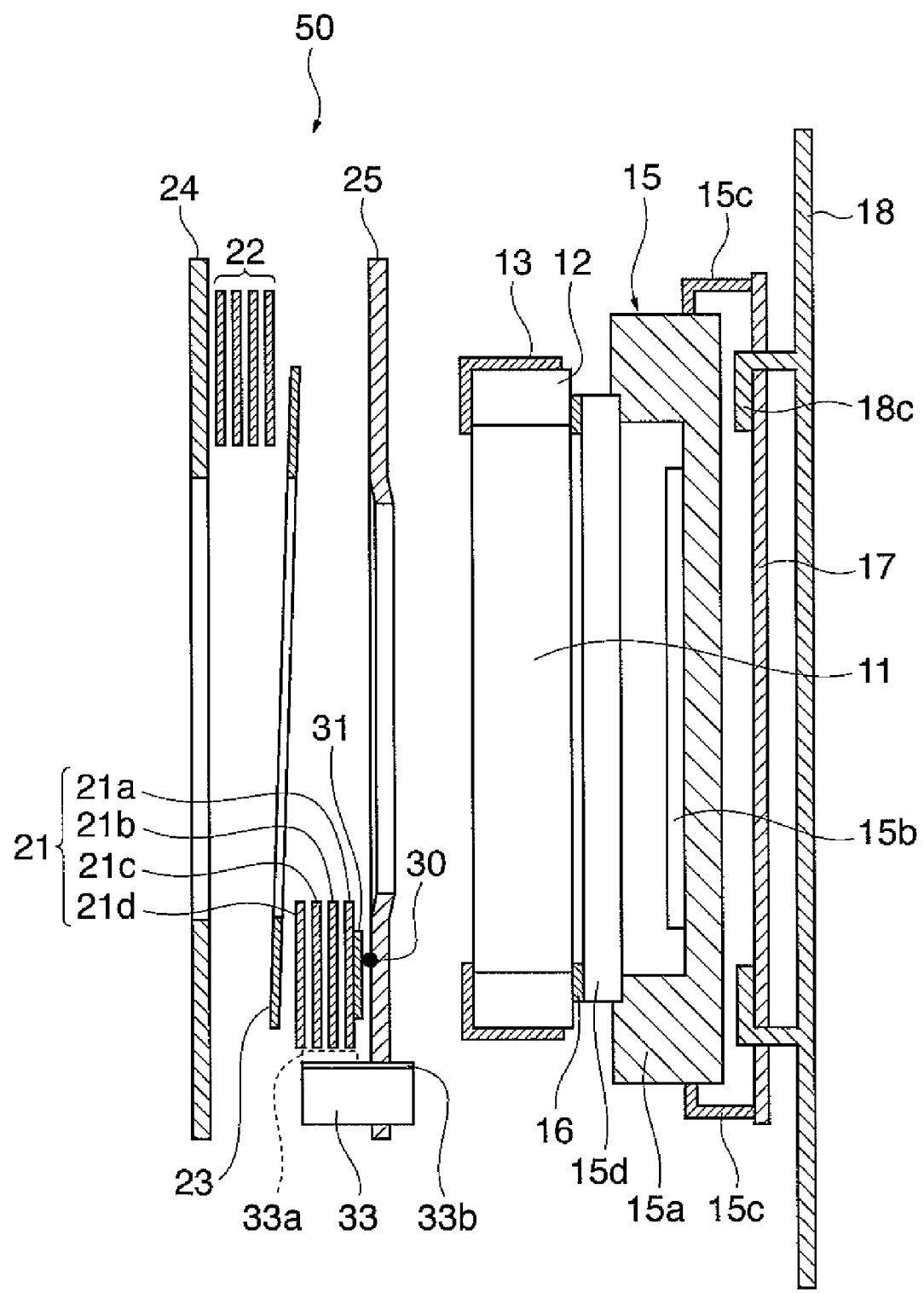
FIG. 12 is a longitudinal cross-sectional view of a state of finishing the opening operation of the front screen.

Next, details of the cleaning mode process will be described with reference to FIGS. 10 to 12. FIGS. 10A and 10B are flow charts showing a procedure of the cleaning mode process executed by the camera system control section 135. FIG. 11 is a longitudinal cross-sectional view of a state in the middle of opening operation of the front screen 21. FIG. 12 is a longitudinal cross-sectional view of a state of finishing the opening operation of the front screen 21. Here, the procedure shown in the flow charts of FIGS. 10A and 10B is executed according to a program stored in the ROM 601 by the CPU 600 of the camera system control section 135.

According to this embodiment, the surface to which the dust which can lead to image shadows onto the image captured is the surface of the optical filter 11. The dust stuck to the surface of the optical filter 11 is a subject of removal. The cleaning mode is a mode for causing the front screen 21 to perform specific opening and closing operation with voltage applied to the electrode member 31 provided to the shutter blade 21a of the front screen 21 in order to remove the dust stuck to the surface of the optical filter 11.

To be more precise, as shown in FIGS. 10A and 10B, the CPU 600 of the camera system control section 135 monitors whether or not the cleaning mode setting is performed through the operation of the cleaning switch 123 (FIG. 1) based on the operation detection signal from the operation detection section 136 (step S100). Here, when the setup of the cleaning mode is detected (YES in step S100), the CPU 600 stores the mode and shooting conditions (such as a shutter speed, a diaphragm value and the like) set up immediately before setting up the cleaning mode in the RAM 602 (step S101).

Next, the CPU 600 outputs the control signal to instruct full opening of the front screen 21 (shutter blades 21a to 21d) to the shutter control section 145 (step S102). The shutter control section 145 drives the front screen driving source 35 so that the front screen 21 fully opens based on the control signal. Driving speed V of the front screen 21 in this case is driving speed V1 (first speed) of the front screen 21 at normal times such as when in the shooting mode. And the CPU 600 waits until it detects that the front screen 21 (shutter blades

21a to 21d) has fully opened based on an output of a sensor (not shown) provided to the focal plane shutter 50 (step S103).

Here, when it is detected that the front screen 21 has fully opened (YES in step S103), the CPU 600 outputs the control signal to instruct application of voltage to the electrode member 31 provided to the shutter blade 21a of the front screen 21 to the power supply 39 (step S104). The power supply 39 applies the voltage to the electrode member 31 based on the control signal. Thus, the electrode member 31 has the gradient force generated in the surface and thickness directions thereof.

Next, the CPU 600 sets the driving speed V of the front screen 21 at the driving speed V2 (second speed), and outputs the control signal to instruct full closing of the front screen 21 at the driving speed V2 to the shutter control section 145 (step S105). The shutter control section 145 drives the charge driving source 36 so that the front screen 21 fully closes based on the control signal. Here, the driving speed V2 of the front screen 21 in this case is a slower speed than the driving speed (=V1) of the front screen 21 at normal times such as when in a shooting mode. This is because it is advantageous in attracting the dust 30 stuck to the surface of the optical filter 11 to the electrode member 31 as will be described later. In conjunction with closing operation of the front screen 21, the electrode member 31 mounted on the shutter blade 21a thereof moves together with the shutter blade 21a. In this case, the gradient force is generated to the electrode member 31. Therefore, as shown in FIG. 11, the dust 30 on the surface of the optical filter 11 is attracted by the gradient force to the electrode member 31 in the teeth of sticking force for the surface of the optical filter 11 so as to attach to the surface of the electrode member 31. And the CPU 600 waits until it detects that the front screen 21 has fully closed based on an output of the sensor (not shown) provided to the focal plane shutter 50 (step S106).

When it is detected that the front screen 21 has fully closed (YES in step S106), the CPU 600 outputs the control signal to instruct full opening of the front screen 21 to the shutter control section 145 (step S107). Thus, the opening operation of the front screen 21 is started at the driving speed V2. And the CPU 600 waits until it detects that the front screen 21 has fully opened based on an output of the sensor (not shown) provided to the focal plane shutter 50 (step S108).

When it is detected that the front screen 21 has fully opened (YES in step S108), the CPU 600 outputs the control signal to instruct a stop of the application of voltage to the electrode member 31 to the power supply 39 (step S109). The power supply 39 stops the application of voltage to the electrode member 31 based on the control signal. Thus, the gradient force generated on the electrode member 31 is vanished.

Next, the CPU 600 keeps a count as to the preset time from a time point when the full opening of the front screen 21 was detected with a timer (not shown), and maintains the fully opening state of the front screen 21 for a preset period of time (step S110). To be more specific, the front screen 21 is maintained in the fully opening state as shown in FIG. 12. Here, the gradient force generated on the electrode member 31 is vanished when the front screen 21 is in the fully opening state. Therefore, in the time period when the front screen 21 is maintained in the fully opening state, the dust 30 stuck to the surface of the electrode member 31 separates from the surface and drops due to gravity to be caught by the absorbing section 33b. As a result, the dust 30 removed from the surface of the optical filter 11 neither drifts in the camera body 100 nor reattaches to the surface of the optical filter 11.

Next, the CPU 600 sets the driving speed V of the front screen 21 at the normal driving speed V1, and outputs the control signal to instruct full closing of the front screen 21 at the driving speed V1 to the shutter control section 145 (step S111). The shutter control section 145 drives the charge driving source 36 so that the front screen 21 fully closes at the driving speed V1 based on the control signal. And the CPU 600 waits until it detects that the front screen 21 has fully closed based on an output of the sensor (not shown) provided to the focal plane shutter 50 (step S112).

When it is detected that the front screen 21 has fully closed (YES in step S112), the CPU 600 cancels the cleaning mode (step S113) and displays a message indicating that the cleaning mode was canceled on the display 107 (step S114).

Next, the CPU 600 reads the mode settings and shooting conditions immediately before setting up the cleaning mode stored in the RAM 602 to return to the state immediately before the cleaning mode setting (step S115). Then the CPU 600 finishes this processing.

Here, in the cleaning mode process, the specific opening and closing operation of the front screen 21 for moving the electrode member 31 to the optical filter 11 is the opening and closing operation performed in the step S105 to step S110.

Thus, according to this embodiment, it is possible to remove the dust stuck to the surface of the optical filter 11 without touching the surface so as not to have a shadow of the dust stuck to the surface of the optical filter 11 caught in the image. To be more specific, it is possible to provide a single-lens reflex digital camera capable of taking an image of good image without imaging shadows of dust. Unlike a conventional single-lens reflex digital camera, the removal of the dust is performed without vibrating the optical filter 11. Therefore, it is possible to prevent the optical filter 11 and the members fixed thereon from separating.

As the electrode member 31 is united with the shutter blade 21a of the front screen 21, it is not necessary to newly provide a driving device or a driving member for relatively moving the electrode member 31 to the optical filter 11. Therefore, it is possible to prevent the camera body 100 from becoming larger by installing the driving device or driving member.

Furthermore, the cleaning mode for removing the dust stuck to the surface of the optical filter 11 is set by operation of the cleaning switch 123. Therefore, it is possible to remove the dust stuck to the surface of the optical filter 11 by simple operation.

Furthermore, the dust removed from the surface of the optical filter 11 and stuck to the surface of the electrode member 31 is caught by the absorbing section 33b. Therefore, the dust neither drifts in the camera body 100 nor reattaches to the surface of the optical filter 11.

Second Embodiment

Figure 13:
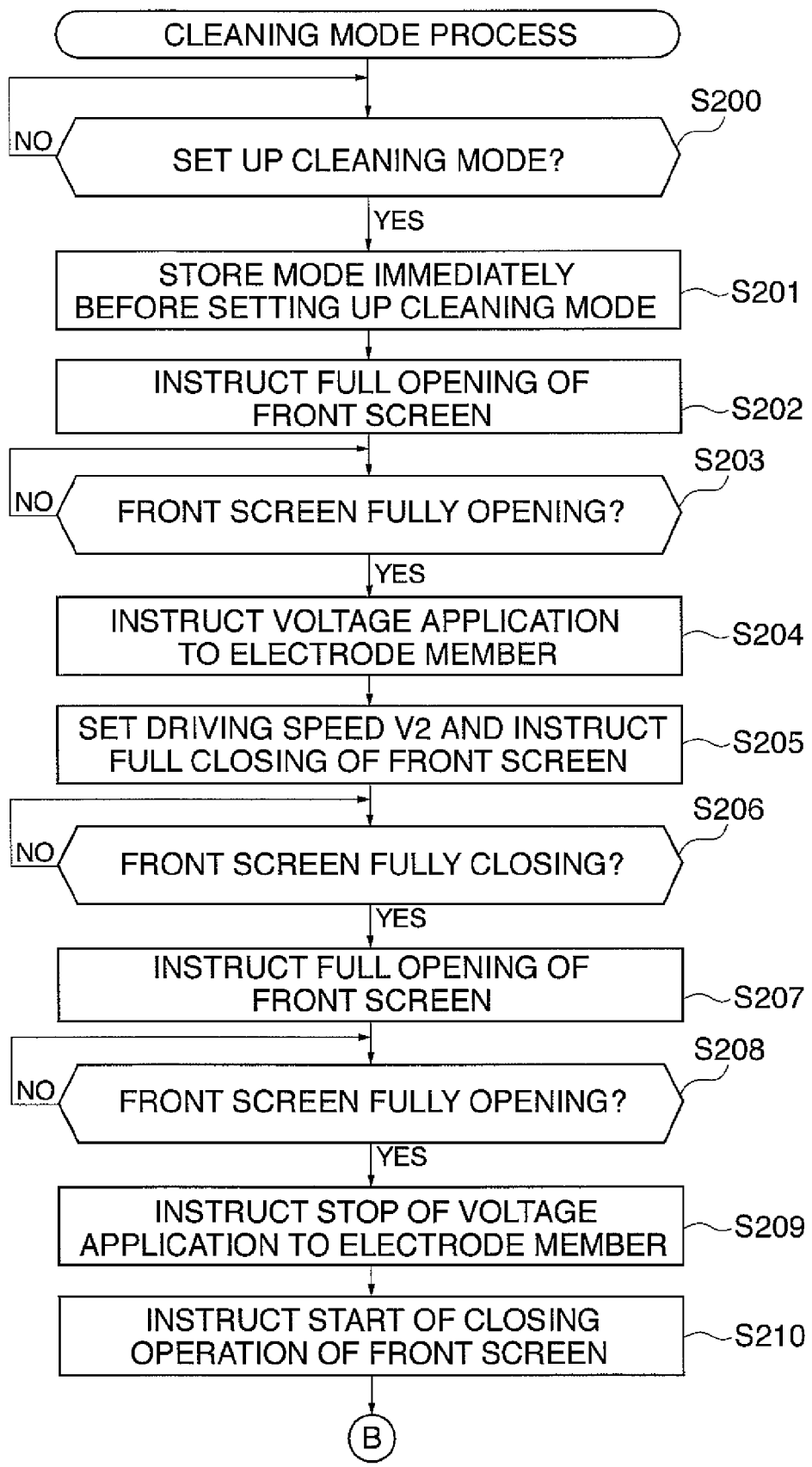
FIG. 13 is a flow chart showing a procedure of a cleaning mode executed by the camera system control section of the digital camera as the image pickup apparatus according to a second embodiment of the present invention.
Figure 14:
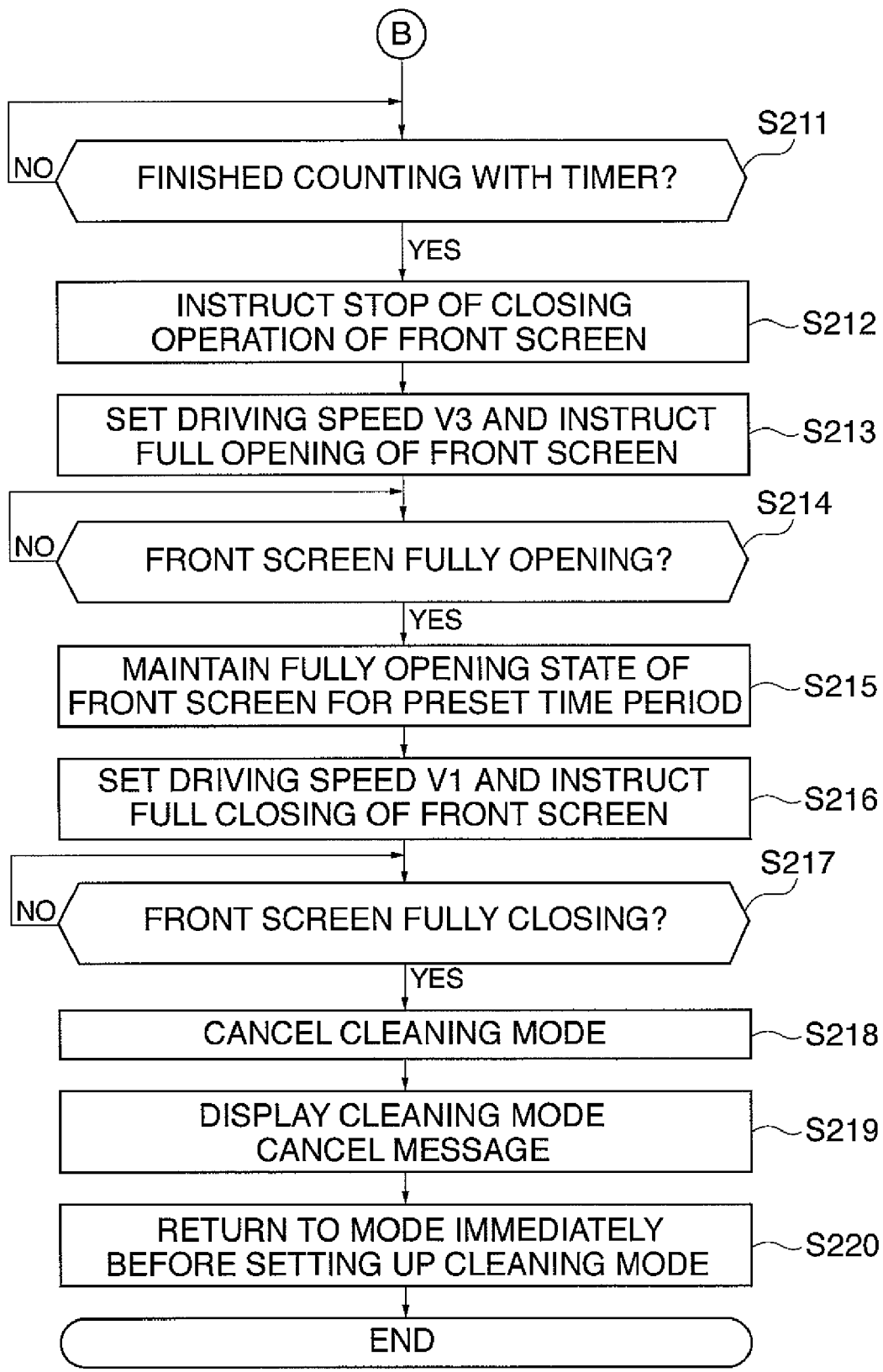
FIG. 14 is a flow chart showing a subsequent procedure of FIG. 13.

Next, a second embodiment of the present invention will be described with reference to FIGS. 13 and 14. FIGS. 13 and 14 are flow charts showing a procedure of the cleaning mode process executed by the camera system control section 135 of the digital camera 1 as the image pickup apparatus according to the second embodiment of the present invention. Here, this embodiment basically has the same configuration as in the first embodiment, and members used in this description identical to those in the configuration in the first embodiment are assigned the same reference numerals. This embodiment will describe a difference from the first embodiment, that is, the cleaning mode process procedure.

The first embodiment adopts the method whereby the dust attracted to the electrode member 31 is dropped to the absorbing section 33b by gravity while utilizing a fact that the gradient force acting on the dust is vanished by stopping voltage application to the electrode member 31. However, the dust stuck to the electrode member 31 has a force other than the gradient force, such as a van der Waals force acting thereon. Therefore, even if the gradient force acting on the dust is vanished, it is not always true that the dust is dropped from the electrode member 31 to the absorbing section 33b by gravity. To be more specific, there is a possibility that the dust remains on the surface of the electrode member 31 even if the voltage application to the electrode member 31 is stopped.

Thus, according to this embodiment, the opening and closing operation of the front screen 21 different from that in the first embodiment is performed in the cleaning mode in order to reduce the remaining amount of the dust on the surface of the electrode member 31 as much as possible.

To be more precise, as shown in FIG. 13, the CPU 600 of the camera system control section 135 monitors whether or not the cleaning mode setting is performed through the operation of the cleaning switch 123 based on the operation detection signal from the operation detection section 136 (step S200). Here, when the setup of the cleaning mode is detected (YES in step S200), the CPU 600 stores the mode setting and shooting conditions (such as a shutter speed, a diaphragm value and the like) set up immediately before setting up the cleaning mode in the RAM 602 (step S201).

Next, the CPU 600 outputs the control signal to instruct full opening of the front screen 21 (shutter blades 21a to 21d) to the shutter control section 145 (step S202). The shutter control section 145 drives the front screen driving source 35 so that the front screen 21 fully opens based on the control signal. The driving speed V of the front screen 21 in this case is the driving speed V1 of the front screen 21 at normal times such as when in the shooting mode. And the CPU 600 waits until it detects that the front screen 21 has fully opened based on an output of the sensor (not shown) provided to the focal plane shutter 50 (step S203).

When it is detected that the front screen 21 has fully opened (YES in step S203), the CPU 600 outputs the control signal to instruct application of voltage to the electrode member 31 to the power supply 39 (step S204). The power supply 39 applies the voltage to the electrode member 31 based on the control signal. Thus, the electrode member 31 has the gradient force generated in the surface and thickness directions thereof.

Next, the CPU 600 sets the driving speed V of the front screen 21 at the driving speed V2, and outputs the control signal to instruct full closing of the front screen 21 at the driving speed V2 to the shutter control section 145 (step S205). The shutter control section 145 drives the charge driving source 36 so that the front screen 21 fully closes based on the control signal. In conjunction with the fully closing operation of the front screen 21, the electrode member 31 moves while scanning the surface of the optical filter 11. In this case, the gradient force is generated to the electrode member 31. Therefore, the dust 30 on the surface of the optical filter 11 is attracted by the gradient force to the electrode member 31 in the teeth of sticking force for the surface of the optical filter 11 so as to attach to the surface of the electrode member 31. And the CPU 600 waits until it detects that the front screen 21 has fully closed based on an output of the sensor (not shown) provided to the focal plane shutter 50 (step S206).

When it is detected that the front screen 21 has fully closed (YES in step S206), the CPU 600 outputs the control signal to instruct full opening of the front screen 21 at the driving speed V2 to the shutter control section 145 (step S207). And the CPU 600 waits until it detects that the front screen 21 has fully opened based on an output of the sensor (not shown) provided to the focal plane shutter 50 (step S208).

When it is detected that the front screen 21 has fully opened (YES in step S208), the CPU 600 outputs the control signal to instruct a stop of the application of voltage to the electrode member 31 to the power supply 39 (step S209). The power supply 39 stops the application of voltage to the electrode member 31 based on the control signal. Thus, the gradient force generated on the electrode member 31 is vanished. Therefore, at least a part of the dust stuck to the surface of the electrode member 31 separates from the surface and drops to be caught by the absorbing section 33b.

Next, the CPU 600 outputs the control signal to instruct a start of closing operation of the front screen 21 to the shutter control section 145 (step S210). Thus, the charge driving source 36 is driven, and the closing operation of the front screen 21 is started at the driving speed V2. In this case, the CPU 600 sets the time for stopping the front screen 21 in the state before fully closing on the timer (not shown), and operates the timer.

Next, as shown in FIG. 14, the CPU 600 waits until the count for the set time by the timer finishes (step S211). Here, on finishing the count for the set time by the timer (YES in step S211), the CPU 600 outputs the control signal to instruct a stop of the closing operation of the front screen 21 to the shutter control section 145 (step S212). Thus, the closing operation of the front screen 21 is stopped in the state before the front screen 21 fully closes.

Next, the CPU 600 sets the driving speed V of the front screen 21 at a driving speed V3 (third speed), and outputs the control signal to instruct full opening of the front screen 21 at the driving speed V3 to the shutter control section 145 (step S213). Here, the driving speed V3 is a faster speed than the driving speed V1. Thus, the charge driving source 36 is driven so that the front screen 21 fully opens at the driving speed V3. And the CPU 600 waits until it detects that the front screen 21 has fully opened based on an output of the sensor (not shown) provided to the focal plane shutter 50 (step S214).

When the full opening of the front screen 21 is detected (YES in step S214), the CPU 600 keeps a count as to the preset time period from a time point when completion of the opening operation of the front screen 21 was detected by the timer (not shown), and maintains the fully opening state of the front screen 21 for a preset period of time (step S215). Here, the driving speed V3 when the front screen 21 has fully opened is a faster speed than the driving speed V1 so that impact force is greater than usual impact force when the shutter blade 21a is struck by the stopper section 33a. Thus, in the time period when the front screen 21 is maintained in the fully opening state, the dust remaining on the surface of the electrode member 31 securely separates from the surface and drops to be caught by the absorbing section 33b. To be more specific, it is expectable to infinitely reduce the amount of the dust remaining on the surface of the electrode member 31 after vanishing the gradient force acting on the dust. Therefore, it is possible to prevent the dust remaining on the surface of the electrode member 31 from leaving the surface to start drifting in the camera body 100 some time later and consequently from reattaching to the surface of the optical filter 11.

After maintaining the fully opening state of the front screen 21 for the preset time period, the CPU 600 sets the driving speed V of the front screen 21 at the driving speed V1, and outputs the control signal to instruct full closing of the front screen 21 at the driving speed V1 to the shutter control section 145 (step S216). Thus, the charge driving source 36 is driven so that the front screen 21 fully closes at the driving speed V1. And the CPU 600 waits until it detects that the front screen 21 has fully closed based on an output of the sensor (not shown) provided to the focal plane shutter 50 (step S217).

When it is detected that the front screen 21 has fully closed (YES in step S217), the CPU 600 cancels the cleaning mode (step S218) and displays a message indicating that the cleaning mode was canceled on the display 107 (step S219). Next, the CPU 600 reads the mode settings and shooting conditions immediately before setting up the cleaning mode stored in the RAM 602 to return to the state immediately before the cleaning mode setting (step S220). Then the CPU 600 finishes this processing.

Thus, according to this embodiment, it is possible, even if the dust is remained on the surface of the electrode member 31 by a force other than the gradient force, such as a van der Waals force, to securely cause the remaining dust to separate from the electrode member 31 and catch it with the absorbing section 33b.

Third Embodiment

Figure 15:
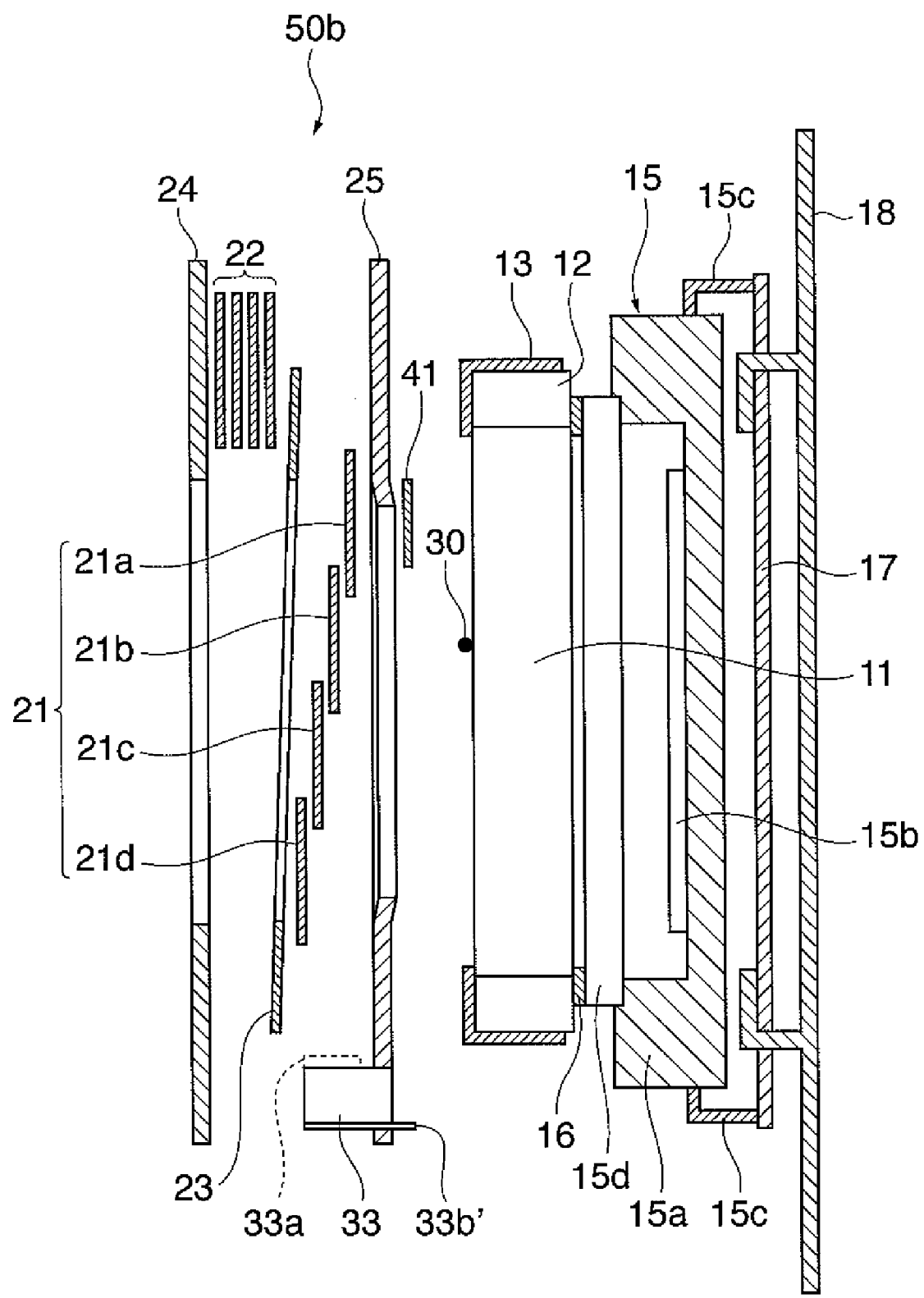
FIG. 15 is a longitudinal cross-sectional view showing the configuration of peripheral components of the focal plane shutter and the solid image-pickup apparatus of the digital camera as the image pickup apparatus according to a third embodiment of the present invention.

Next, a third embodiment of the present invention will be described with reference to FIG. 15. FIG. 15 is a longitudinal cross-sectional view showing the configuration of peripheral components of the focal plane shutter 50b and the solid image-pickup apparatus 15 of the digital camera 1 as the image pickup apparatus according to the third embodiment of the present invention. Here, this embodiment basically has the same configuration as in the first embodiment, and members used in this description identical to those in the configuration in the first embodiment are assigned the same reference numerals. A description will be given as to a difference of this embodiment from the first embodiment.

As shown in FIG. 15, this embodiment is different from the first embodiment in that an electrode member 41 is provided independently from the shutter blade 21a of the front screen 21. Here, the configuration of the electrode member 41 is the same as that of the electrode member 31 of the first embodiment, and so a detailed description thereof will be omitted. The electrode member 41 is placed between the cover plate 25 and the optical filter 11. The electrode member 41 is moved by an interlocking mechanism (not shown) to scan the surface of the optical filter 11 in conjunction with the opening and closing operation of the shutter blade 21a of the front screen 21 by the front screen driving source 35 and the charge driving source 36 in FIG. 9. The configuration of the interlocking mechanism will be omitted here. The electrode member 41 has preset voltage applied thereto from the power supply 39 in FIG. 9. Timing for application of the voltage is the same timing as in the first or second embodiment. The member 33 is provided with an absorbing section 33b'. The absorbing section 33b' is placed to be opposed to the electrode member 41 when the electrode member 41 reaches a position corresponding to the position of the shutter blade 21a at full opening of the front screen 21.

According to this embodiment, when in the cleaning mode, the opening and closing operation of the front screen 21 (movement of the electrode member 41) and the operation of voltage application to the electrode member 41 are controlled by the same procedure as in the first (or second) embodiment. Thus, the surface of the optical filter 11 is scanned by the electrode member 41 with the gradient force generated, and the dust 30 stuck to the surface of the optical filter 11 is attracted and stuck to the surface of the electrode member 41. And when the voltage application to the electrode member 41 is stopped, the dust 30 stuck to the surface of the electrode member 41 drops from the surface to be caught by the absorbing section 33b'.

Fourth Embodiment

Figure 16:
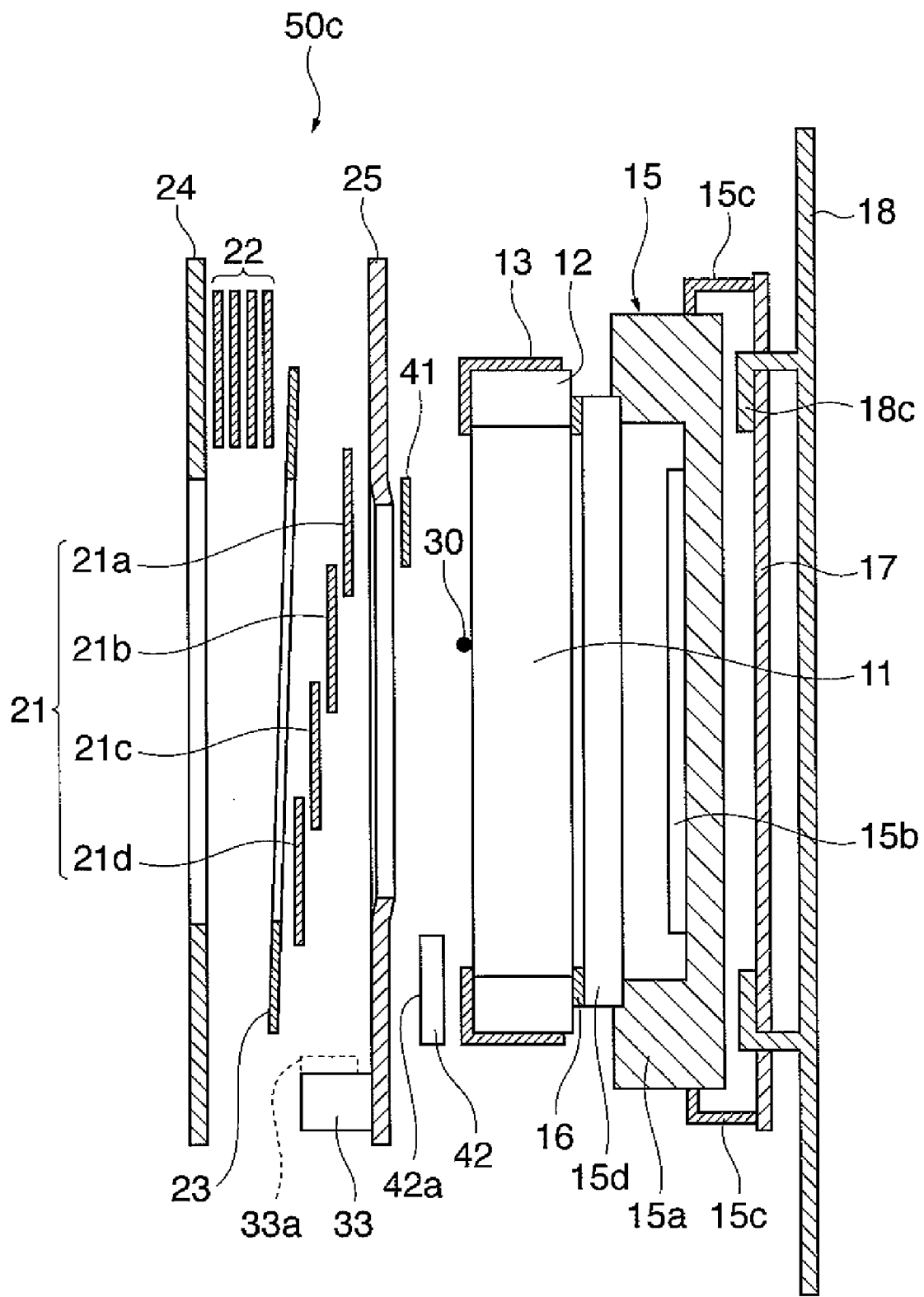
FIG. 16 is a longitudinal cross-sectional view showing the configuration of peripheral components of the focal plane shutter and the solid image-pickup apparatus of the digital camera as an image pickup apparatus according to a fourth embodiment of the present invention.

Next, a fourth embodiment of the present invention will be described with reference to FIG. 16. FIG. 16 is a longitudinal cross-sectional view showing the configuration of peripheral components of a focal plane shutter 50c and the solid image-pickup apparatus 15 of the digital camera 1 as an image pickup apparatus according to the fourth embodiment of the present invention. Here, a description will be given as to a difference from the third embodiment.

As shown in FIG. 16, according to this embodiment, an absorption member 42 is provided instead of the absorbing section 33b' of the third embodiment. The absorption member 42 is placed in a position to be opposed to the surface (electrode formation surface) of the electrode member 41 when the electrode member 41 reaches the fully opening position of the front screen 21. An adhesive absorbing section 42a is formed on the surface of the absorption member 42 (opposed surface to the electrode member 41). Voltage is applied to the absorption member 42 to charge its surface, that is, the absorbing section 42a at a preset potential.

According to this embodiment, when in the cleaning mode, the opening and closing operation of the front screen 21 (movement of the electrode member 41) and the operation of voltage application to the electrode member 41 are controlled by the same procedure as in the first (or second) embodiment. Thus, the surface of the optical filter 11 is scanned by the electrode member 41 with the gradient force generated, and the dust 30 stuck to the surface of the optical filter 11 is attracted and stuck to the surface of the electrode member 41. And the voltage application to the electrode member 41 is stopped when the electrode member 41 reaches the fully opening position of the front screen 21.

According to this embodiment, voltage is applied to the absorption member 42 almost at the same time as the stop of the voltage application to the electrode member 41. Thus, the absorbing section 42a is charged so that electrostatic force acts between the dust 30 stuck to the surface of the electrode member 41 and the absorbing section 42a. The electrostatic force causes the dust 30 on the surface of the electrode member 41 to separate from the surface and get caught by the absorbing section 42a.

Here, the configuration for catching the dust 30 stuck to the electrode member 41 by using the absorption member 42 is also applicable to the first and second embodiments. In this case, the absorption member 42 is provided to be opposed to the electrode member 31 provided to the shutter blade 21a when the front screen 21 reaches the fully opening position.

According to each of the embodiments, the surface of the optical filter 11 placed between the focal plane shutter 50, 50b, 50c and the solid image-pickup apparatus 15 is the subject plane for dust removal. In comparison, there are the cases where no optical filter 11 is placed between the focal plane shutter 50, 50b, 50c and the solid image-pickup apparatus 15 when the cover member 15d itself has an optical filter characteristic. In such cases, the subject plane for dust removal is the surface of the cover member 15d of the solid image-pickup apparatus 15. Even in these cases, it is possible to remove the dust stuck to the surface of the cover member 15d without touching the surface by using the same electrode member and configuration for moving it as described above.

Other Embodiments

The focal plane shutters 50, 50b and 50c according to the embodiments include the front screen 21 and rear screen 22.

However, they are not limited thereto. For instance, a focal plane shutter not including the rear screen 22 and intermediate plate 23 shown in FIG. 2 is presumable. In the case of using such a focal plane shutter, it is possible to realize a shutter function by performing a reset drive of the solid image-pickup element 15b to be a front screen operation (electronic front screen drive) and following it to operate the front screen 21 shown in FIG. 2 as a rear screen. Even in the case of operating it like this, the electrode member 31 on the shutter blade 21a can realize the cleaning mode process indicated in the first and second embodiments. Even in the case where the electrode member 41 is not on the shutter blade as indicated in the third and fourth embodiment, the cleaning mode process can be realized likewise. To be more specific, the relation between the electrode member 31 (or electrode member 41) and the surface of the optical filter 11 (or cover member 15d) is not influenced by the rear screen 22. Therefore, the cleaning mode process should be operated on the presumption that no rear screen 22 exists in each of the embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Applications No. 2006-146608, filed May 26, 2006, which is hereby incorporated by reference herein in its entirety.

What is claimed is:

1. An image pickup apparatus comprising:
   an optical element including an optical incidence plane;
   an image pickup device adapted to convert light having transmitted through the optical element to an electrical signal;
   a non-uniform electric field generating device adapted to generate a non-uniform electric field to attract minute foreign substance stuck to the optical incidence plane of the optical element when applying voltage, the non-uniform electric field generating device having a first electrode and a second electrode with a gap length between the first electrode and the second electrode being uneven; and
   a drive unit adapted to apply the voltage between the first electrode and the second electrode, the drive unit moving the non-uniform electric field generating device to scan the optical incidence plane of the optical element.

2. The image pickup apparatus according to claim 1, wherein:
   a route for the drive unit to move the non-uniform electric field generating device is composed of a both-way route including an approach route leading from a first position to a second position and a return route going back on the approach route; and
   the drive unit moves the non-uniform electric field generating device along the both-way route, and applies the voltage to the non-uniform electric field generating device while the non-uniform electric field generating device is moved along the both-way route.

3. The image pickup apparatus according to claim 2, wherein:
   on moving the non-uniform electric field generating device along the both-way route and returning it to the first position again, the drive unit stops the non-uniform electric field generating device in the first position and stops the voltage application to the non-uniform electric field generating device.

4. The image pickup apparatus according to claim 2, further comprising:
   a focal plane shutter placed in front of said optical element and adapted to open and close the optical path by opening and closing a front screen and a rear screen with corresponding drive mechanisms respectively;
   a shutter control unit adapted to control said drive mechanism of said front screen of said focal plane shutter so that said front screen performs a specific opening and closing operation; and wherein:
   said drive unit is composed of said drive mechanism of said front screen of said focal plane shutter and said shutter control unit, and moves said non-uniform electric field generating device along the both-way route in conjunction with the specific opening and closing operation of said front screen.

5. The image pickup apparatus according to claim 1, wherein:
   the first position is a position corresponding to a fully opening position of said front screen of said focal plane shutter while the second position is a position corresponding to a fully closing position of said front screen; and
   the specific opening and closing operation of said front screen is an opening and closing operation to return said front screen from its fully opening position to its fully opening position again through its fully closing position.

6. The image pickup apparatus according to claim 5, wherein:
   said non-uniform electric field generating device is mounted on said front screen; and
   said non-uniform electric field generating device is moved along the both-way route by the specific opening and closing operation of said front screen.

7. The image pickup apparatus according to claim 1, wherein:
   the non-uniform electric field generating device is placed between a focal plane shutter and the optical element; and
   the drive unit includes an interlocking mechanism to move the non-uniform electric field generating device in conjunction with a specific opening and closing operation of a front screen.

8. The image pickup apparatus according to claim 4, wherein:
   when performing the specific opening and closing operation of said front screen, said shutter control unit controls said drive mechanism of said front screen to perform the opening and closing operation of said front screen at a slower speed than a speed at normal time.

9. The image pickup apparatus according to claim 4, wherein:
   the first position is a position corresponding to a fully opening position of said front screen of said focal plane shutter while the second position is a position corresponding to a fully closing position of said front screen; and
   the specific opening and closing operation of said front screen includes a first opening and closing operation to return said front screen from its fully opening position to its fully opening position again through the fully closing position and a second opening and closing operation to move said front screen, after the first opening and closing operation, from its fully opening position to a position short of its fully closing position and return it from the position short of its fully closing position to the fully opening position again.

10. The image pickup apparatus according to claim 9, wherein:
said non-uniform electric field generating device is mounted on said front screen; and
said non-uniform electric field generating device is moved along the both-way route by the specific opening and closing operation of said front screen.

11. The image pickup apparatus according to claim 9, wherein:
when performing the first opening and closing operation, said shutter control unit controls said drive mechanism of said front screen to perform said front screen at a second speed slower than a first speed at normal time, while when performing one moving operation of moving said front screen from the fully opening position to the position short of its fully closing position in the second opening and closing operation, to perform said front screen to move at the second speed, and while when performing the other moving operation of returning said front screen from the position short of its fully closing position to the fully opening position again in the second opening and closing operation, to perform said front screen to move at a third speed faster than the first speed.

12. The image pickup apparatus according to claim 2, wherein:
an absorption unit adapted to absorb minute foreign substance is provided in proximity to the first position.

13. The image pickup apparatus according to claim 12, wherein:
the absorption unit includes an adhesive member.

14. The image pickup apparatus according to claim 12, wherein:
said absorption unit includes an adhesive member and an attraction generating mechanism to generate a force of attracting the minute foreign substance on to the member.

15. The image pickup apparatus according to claim 1, wherein:
said non-uniform electric field generating device is composed of a tabular member having a plurality of electrodes formed on its surface; and
the plurality of electrodes are placed so that their electrode distance becomes uneven.

16. The image pickup apparatus according to claim 1, wherein:
said optical element has preset transmission characteristics; and
a transmission member to cover said image pickup device is placed between said image pickup device and said optical element.

17. The image pickup apparatus according to claim 1, wherein:
said optical element is a transmission member to cover said image pickup device.

* * * * *